United States Patent [19]
Eick et al.

[11] Patent Number: 5,847,972
[45] Date of Patent: Dec. 8, 1998

[54] METHOD AND APPARATUS FOR GRAPHICALLY ANALZYING A LOG-FILE

[76] Inventors: Stephen Gregory Eick, 1413 Durness Ct., Naperville, Ill. 60565; Paul Jay Lucas, 18 Huntington Cir. West Apt. 10, Naperville, Ill. 60540; Jeffrey Donald Schmidt, 1114 Pinegrove Ct., Aurora, Ill. 60504

[21] Appl. No.: 126,846

[22] Filed: Sep. 24, 1993

[51] Int. Cl.$^6$ ............................................. G06K 15/22
[52] U.S. Cl. .................................. 364/514 A; 395/140
[58] Field of Search ........................... 364/408, 921.9, 364/514 A; 395/140, 142, 119, 575; 371/15.1

[56] References Cited

U.S. PATENT DOCUMENTS

| | | | |
|---|---|---|---|
| 4,849,910 | 7/1989 | Jacobs et al. | 395/140 |
| 5,043,920 | 8/1991 | Malm et al. | 395/119 |
| 5,058,113 | 10/1991 | Burnham et al. | 371/15.1 |
| 5,062,147 | 10/1991 | Pickett et al. | 395/575 |
| 5,075,873 | 12/1991 | Seki et al. | 395/140 |
| 5,121,470 | 6/1992 | Trautmau | 395/140 |
| 5,347,452 | 9/1994 | Bay, Jr. | 364/408 |

OTHER PUBLICATIONS

"The X Window System", R. W. Scheifler, J. Gettys, ACM Transactions on Graphics, vol. 5, No. 2, Apr. 1986, pp. 79–109.

"Seesoft–A tool for Visualizing Line Oriented Software Statistics", S. G. Eick, J. L. Steffen, E.E. Sumner, Jr. —IEEE Transactions on Software Engineering, vol. 18, No. 11, Nov. 1992, pp. 957–968.

"Graphical Analysis of Computer Log Files", S. G. Eick, M. C. Nelson, J. D. Schmidt, Dec. 19, 1992, pp. 1–22.

"Direct Manipulation: A Step Beyond programming Languages", B. Shneiderman, Univ. of Maryland, IEEE, 1993, pp. 57–69.

T. Lehr et al., "Visualizing Performance Debugging", *Computer*, vol. 22, No. 10, Oct. 1989, pp. 38–50.

S. Aikawa et al., "ParaGraph: A Graphical tuning Tool for Multiprocessor System", *Fujitsu–Scientific and Technical Journal*, vol. 29, No. 2, Jun. 1993, pp. 119–127.

"Translation of Data Generated by the AIX 3.2 Trace Facility into a Format for Visualization of the Data", *IBM Technical Disclosure Bulletin*, vol. 36, No. 7, Jul. 1993, pp. 39–41.

*Primary Examiner*—Emanuel T. Voeltz
*Assistant Examiner*—Thomas Peeso

[57] ABSTRACT

A technique for interactively analyzing system log-files. System log-files, which are monitored by technical personnel and systems specialists to determine system performance, status, and software faults, are often generated during various hardware and software monitoring operations. Each log-file contains time stamped reports. This technique is especially useful for analyzing large log-files. A new release of software may contain many incremental versions that must be tested. The testing of each incremental version may generate a log-file containing thousands of reports. Using this technique, reports are correlated, faults are isolated, and temporal patterns are recognized more quickly and efficiently than by using conventional, non-graphical techniques.

17 Claims, 20 Drawing Sheets

401

601

701

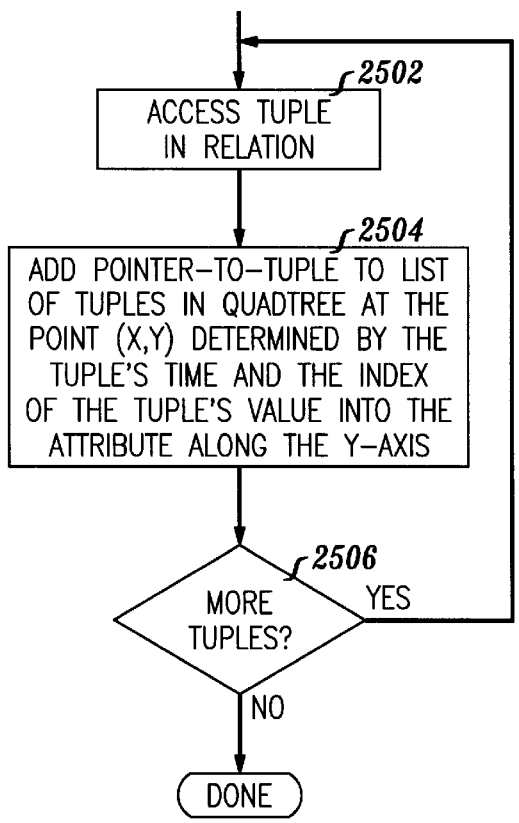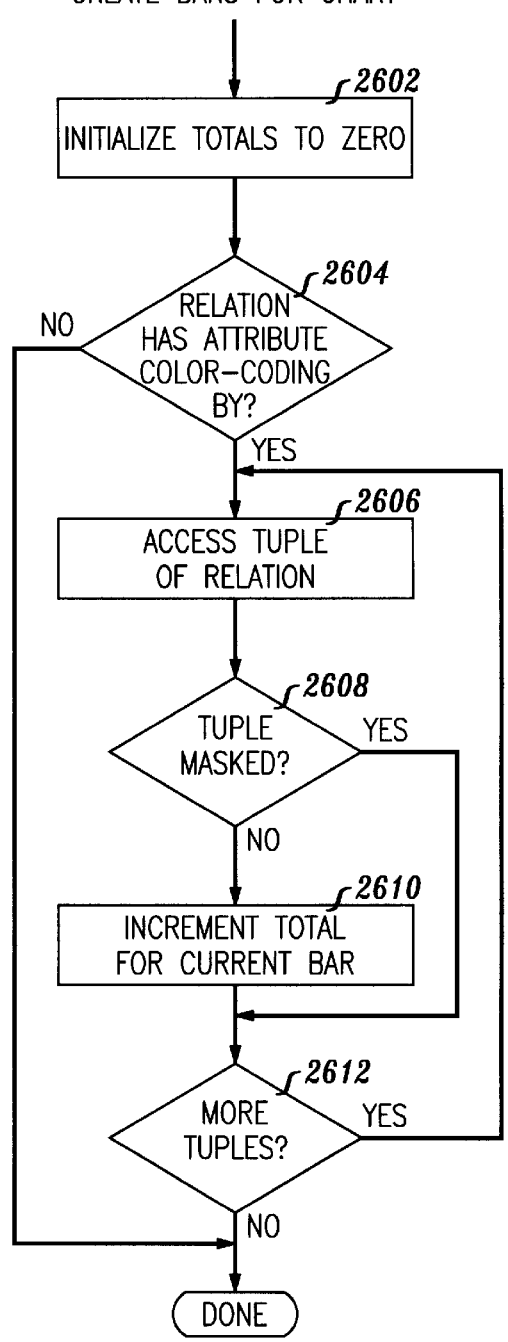

METHOD AND APPARATUS FOR GRAPHICALLY ANALZYING A LOG-FILE

FIELD OF THE INVENTION

The invention concerns graphical displays in systems having one or more processors, such as distributed systems, in general and graphical displays of reports of system log files in particular.

BACKGROUND OF THE INVENTION

Many systems generate log-files as part of their normal operation. Such files typically contain reports on system performance, system status, and software faults. These reports are often free-format text. Each report is individually time-stamped indicating when it was created. By examining a log file, system operators may detect and correct system and software problems before such problems can affect system operation.

A common trait of log-files is that many unimportant reports are created along with the important reports. These "noise" reports clutter-up the log-file and obscure the important reports. For example, a log-file created during a 15 hour test of a new release of a software program including many incremental versions may contain 55,000 reports comprising 100,000 lines of text which is equivalent to 1600 pages. But only hundreds of those reports may actually be significant. The "noise" reports in the log-file may obscure one or more of the important reports and cause it to be overlooked by the operator.

It is an object of the present invention to provide an apparatus for graphically analyzing log files.

It is another object of the invention to provide an apparatus for graphically displaying log files to enable an analyst to find the important reports within the log file.

It is another object of the invention to provide an apparatus that displays reports of a log file according to class and time of occurrence in order to allow the user to see the circumstances of each report.

It is another object of the invention to provide an apparatus that displays reports of a log file according to class and time of occurrence and allows the operator to interactively browse the reports to analyze the cause of the report.

SUMMARY OF THE INVENTION

Briefly stated in accordance with one aspect of the invention the aforementioned objects are achieved by providing an apparatus and method for showing a plurality of time-stamped, messages that have a set of characteristics. The apparatus includes a plurality of symbols, with each symbol corresponding to one of the messages. Each symbol has an appearance that varies according to a characteristic of the message it corresponds to and a position that is determined by a time of the message and a characteristic of the message.

BRIEF DESCRIPTION OF THE DRAWING

While the specification concludes with the appended claims particularly pointing out and distinctly claiming the subject matter which is regarded as the invention, it is believed that the invention will be better understood from the following description taken in conjunction with the accompanying figures in which:

FIG. 19 is a detail of a procedure that produces a plot for a chart.

FIG. 20 is a detail of a procedure that produces bars for a chart.

DETAILED DESCRIPTION

Figure 1:
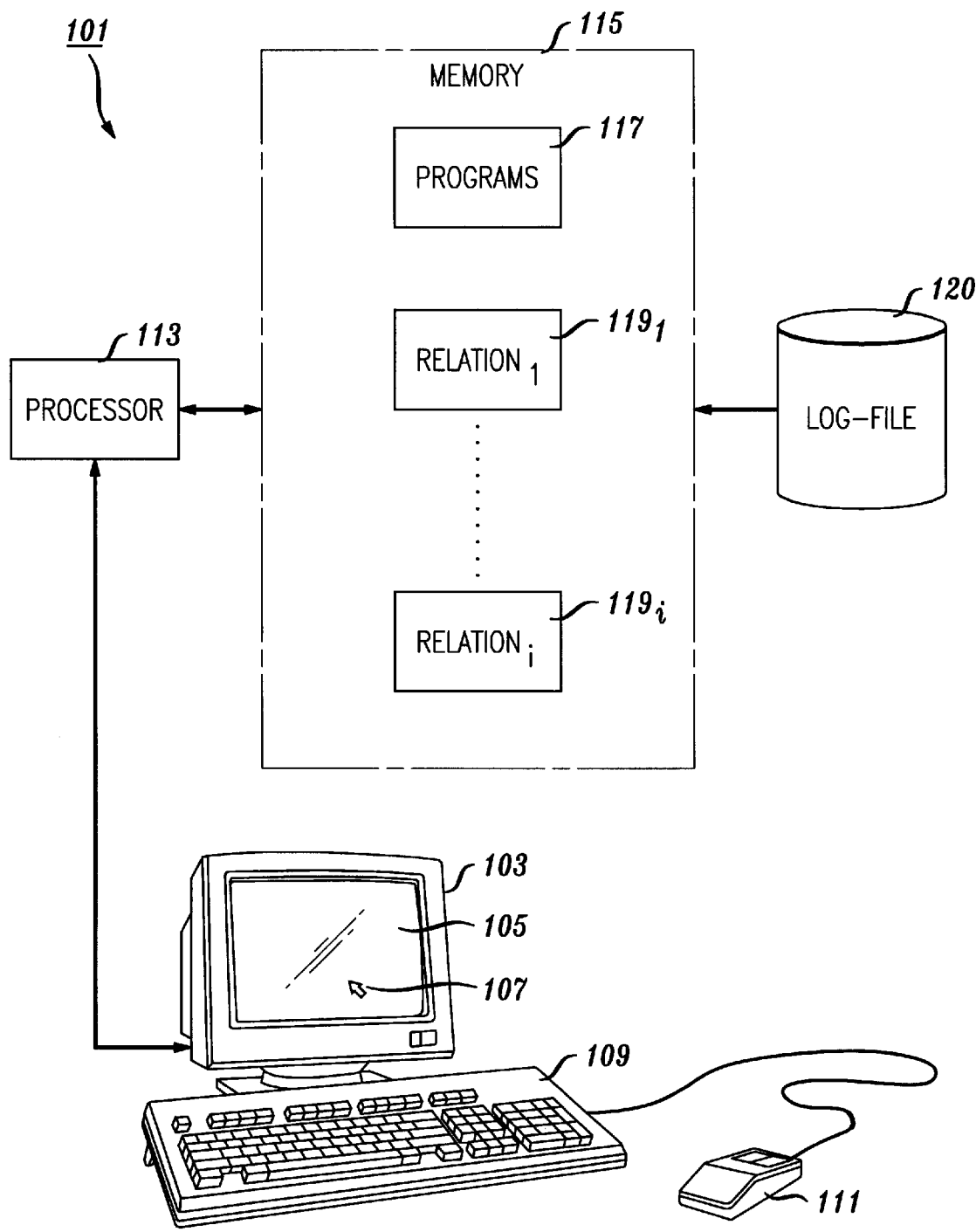
FIG. 1 is a block diagram of an example log file analysis system.

Referring now to FIG. 1, a block diagram of an example log file analysis system 101 is shown. The system 101 includes terminal 103, which provides output to and receives input from the system operator, processor 113, which performs the actual analysis operations, memory system 115, which contains programs 117 executed by processor 113 and relations $119_1$–$119_i$ each of which contains a respective set of tuples. The system 101 also has a mass storage system 120 for storing a log-file in its unprocessed state, i.e. the group of time stamped messages as it was created.

In more detail, terminal 103 includes a display screen 105, upon which processor 113 displays information for the operator. Display screen 105 also includes pointer 107, which specifies a location in display 105 and may be moved under control of either keyboard 109 or mouse 111. The operator controls the operation of system 101 by inputs from keyboard 109 and/or mouse 111. Processor 113 may be any kind of processor, from a personal computer through a workstation or even a supercomputer. Memory system 115, finally, includes any data accessible to system 101, and may thus include random-access memory or read-only memory.

Connected to memory system 115 is mass storage system 120 which reads data into memory system 115 to make such data more accessible or stores such as data for the long term. Mass storage system 120 may include magnetic disk or optical disk.

When employing system 101 to analyze information in a log file, the operator may use keyboard 109 or mouse 111 as input devices. Processor 113 executes programs 117 as required to perform the analysis on the relations $119_1$–$119_i$ and graphically displays the results on display screen 105. The operator can then use keyboard 109 and/or mouse 111 to interactively examine the results in more detail.

The preferred embodiment of system 101 runs under the UNIX® operating system (UNIX is a registered trademark of UNIX Systems Laboratories) using a workstation with the X Window System.

Figure 2:
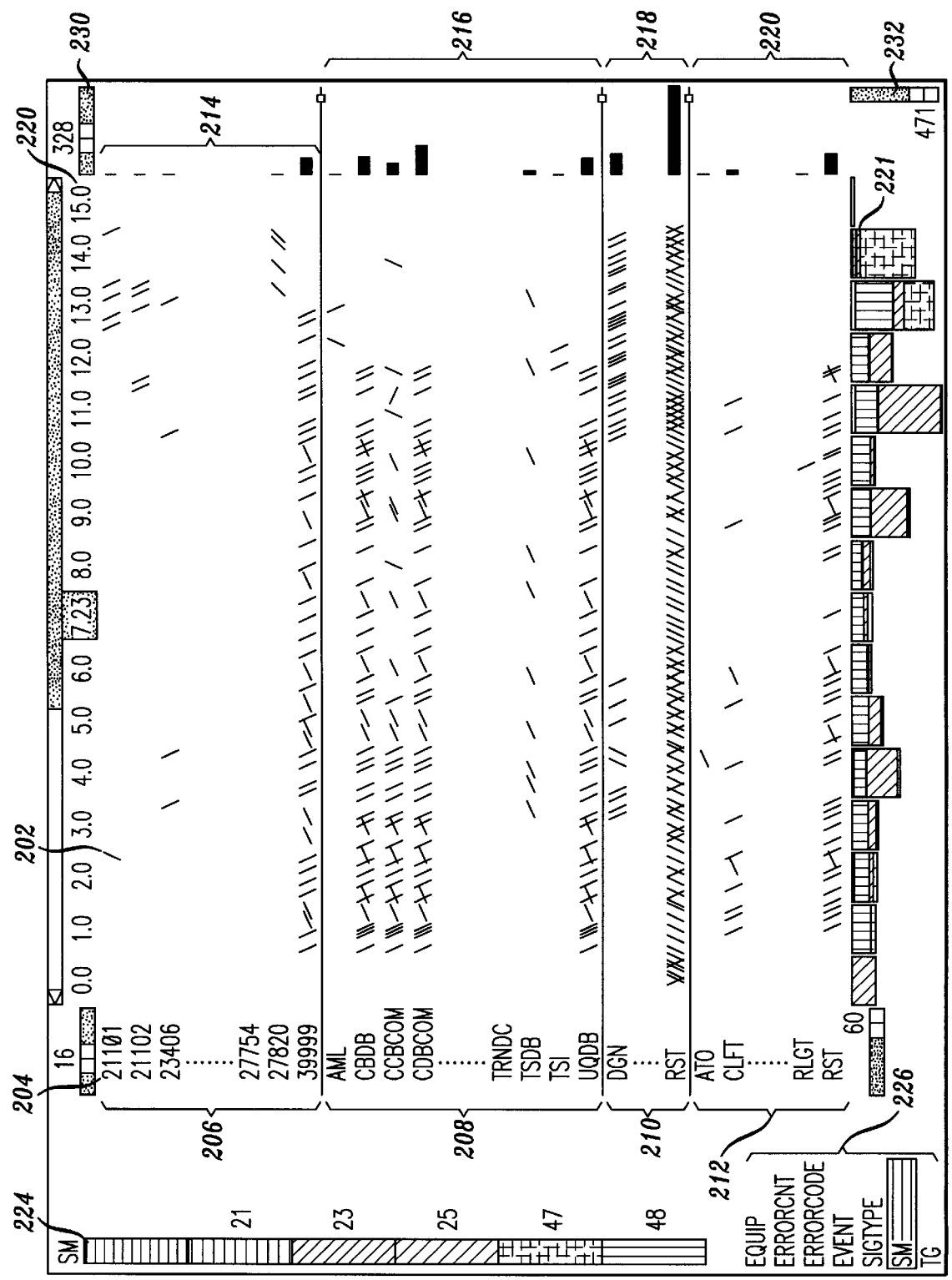
FIG. 2 is a pictorial view typical visual of a display as seen by an operator of the log file analysis system in a preferred embodiment.

Referring now to FIG. 2, a display 201 is shown on display screen 105. This display 201 is of a log file generated during a 15 hour test on a 5ESS® distributed system (5ESS is a registered trademark of AT&T) during development. The log-file contains over 55,000 reports comprising 100,000 lines of text. The display 201 shows four classes of reports: asserts, i.e. detection of a software/data inconsistency; audits, i.e. system database-integrity checkers and correctors; operations-and-maintenance reports, i.e. hardware component removal, diagnostic, restoration and process-purges; and trunk-error reports during communication set-ups.

The first step in making the display 201 of the log-file easier to analyze is the selection of only the "interesting" reports. In this context, "interesting" means those reports that signify either service-affecting or potentially service affecting events and software faults. The "noise" reports from the log-file are filtered out by simply not selecting them for processing or display. For the log-file considered, many of the reports are due to follow-up reports such as stack-frame, stack-trace, and register dumps. For analysis purposes, not only do these "noise" reports not contribute to the discovery of patterns and correlations by the system operator, but they tend to obscure those reports that do so contribute.

The second step in making the display 201 of the log-file easier to analyze is the exploitation of its temporal variations. In other words, use the time-stamp of each report as one coordinate for its placement on the display 201. Previous text based analysis techniques, such as those using visual text editors, obscured the inherent nature of time-stamped log-files because the spatial separation of interesting reports, i.e. the number of lines separating them, encountered while using the text editor has little relation to the period of time required to generate those lines. For example, one five-minute period of a log-file could be represented by reports having a few hundred lines, while another five minute period could be represented by reports having a few thousand lines.

The visualization technique of display 201 according to the present invention has angled tick-marks arranged in a grid. As an example, tick-mark 202 indicates the occurrence of a report regarding asserts 21101 in vertical axis 204. Tick-mark 202 is coded both by its inclination and color, as will be explained below. Along a vertical axis 204 of the grid, reports are broken down by class and type into bands 206, 208, 210 and 212 and rows, respectively. Each band 206–212 is made up of a distinct class of reports. Band 206 is made up of the rows of assert reports, band 208 is made up of the rows of audit reports, band 210 is made up of the operation and maintenance report rows and band 212 is made up of the trunk error report rows. Within a given class, each row is made up of a reports of a single type. A type-name is printed on the left side of each row in vertical axis 204 and the total number of occurrences is shown on the right side of the display in the form of a bar-chart at the end of its corresponding row. The bar charts are scalable by slider 226 and the longest bar that is truncated by the scale appears in light gray. Display 201 can fit approximately 70 rows on display screen 105 simultaneously, this includes type-named rows and rows used for divider lines between bands. The horizontal axis 220 represents time. Time increases to the right of the display 201. Occurrences of a report of a given type are marked by drawing tick-marks along the row corresponding to that type at horizontal positions that corresponds to the respective times of the occurrences as indicated by their time stamps. The total number of occurrences of all report types per unit-time is shown on the bottom of the display in the form of a stacked histogram extending from a second horizontal axis 221, which also represents time. A slider 228 adjusts the scale of the histograms also.

A relational data model is used for the displayed data of display 201. Each of the classes of bands 206–212 corresponds to a single relation $119_1$–$119_i$ (shown in FIG. 1). The unique values for the primary attribute of a relation correspond to the various types within a class. On the left side of the display 201, there is an interactive color scale 224. Interactive color scale 224 is used to color-code report occurrences by the values of secondary attributes 226 of all the relations $119_1$–$119_i$. A set of secondary attributes 226 includes equipment, error count, error code, event, signaling type, processor identification, and trunk group type, as abbreviated in the lower-left corner of the display 201. The differences in gray scale shading in FIG. 2 represents the color coding of the reports according to their respective processor module, AM (unlabeled in FIG. 2), SM21, SM23, SM25, SM47 and SM48, associated with the report. The color coding of the reports is: light blue for SM21, dark green for SM23, light green for SM25, yellow for SM47 and red for SM48. In addition to using color to encode the a characteristic with tick marks for the occurrence of reports, the inclinations of the tick-marks are also used to encode a possibly different characteristic. Use of color and inclination is complementary. If there are many values, colors of adjacent hues can be too close for the operator to distinguish. Encoding the display 201 such that both color and inclination encode an individual attribute makes adjacent values, although close in color, different in angle thus allowing the operator to distinguish between them. Display 201 uses a pre-defined set of six inclination angles that are sufficiently different to allow the operator to distinguish between them. If more than six attributes must be encoded, the same inclination may be reused because by the time the inclination coding "wraps-around," the color coding has progressed to a sufficiently different hue to facilitate differentiation.

The stacked histograms projecting from horizontal axis 221 are also color coded in order to indicate which attributes correspond to the reports generated in the time period of the histogram. This is represented by the differences in gray scale shading of the stacked histograms. Thus, by looking at the stacked histograms of display 201 an operator could see that the performance of the system 101 began to deteriorate starting in the eleventh hour. Similarly, by observing the proportion of dark gray (dark green in the corresponding color figure) in the stacked histograms, the operator could conclude that many of the reports are occurring in processor module SM23.

Figure 3:
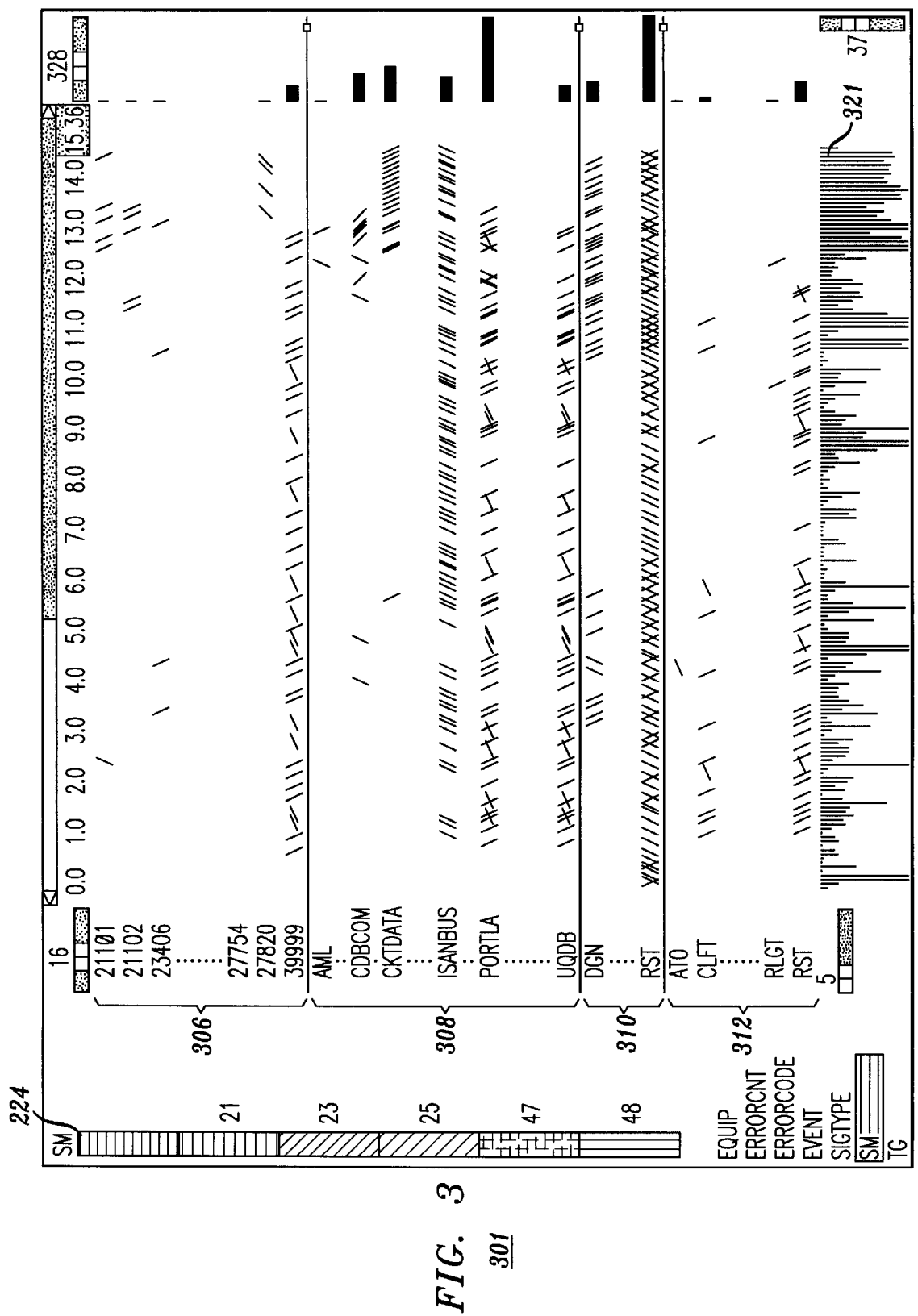
FIG. 3 is a pictorial view similar to FIG. 2 but with finer gradations of time.

Referring now to FIG. 3, display 301 is identical with display 201 except that the horizontal axis 321 is divided into five minute intervals instead of the one hour intervals of horizontal axis 201. This means that the stacked histograms projecting from horizontal axis 321 will represent five minute periods instead of one hour periods. Using this finer grain time division, the operator may now discover spikes of report activity starting after 1.5 hours of testing and repeating approximately every 20 minutes.

Inspection of the bar charts at the end of the rows, shows that most of the report activity is occurring in the audit class in band 308 and operations and maintenance report band 310. According to the length of its bar-chart, the most frequently occurring audit type names were PORTLA, CKTDATA, CDBCOM, and ISANBUS. By the same criterion, the most frequently occurring assert type name was 39999. Review of the PORTLA, CKTDATA, CDBCOM, ISANBUS and 39999 rows in display 301 shows a substantial number of tick marks with the characteristic inclination and color of processor module SM23, confirming what the bar charts showed.

If processor modules SM21, SM25, SM47 and SM48 are experiencing similar problems as those of SM23, only to a lesser degree, a possible system wide problem is indicated. If, however, the problems occurring are isolated to SM23, a localized problem is indicated. Using the interactive color scale 224 at the left of display 301 the tick marks of one or more of the processor modules SM21–SM48 can be turned off, i.e. not displayed, in order to reveal such other significant report patterns within the log-file.

Figure 4:
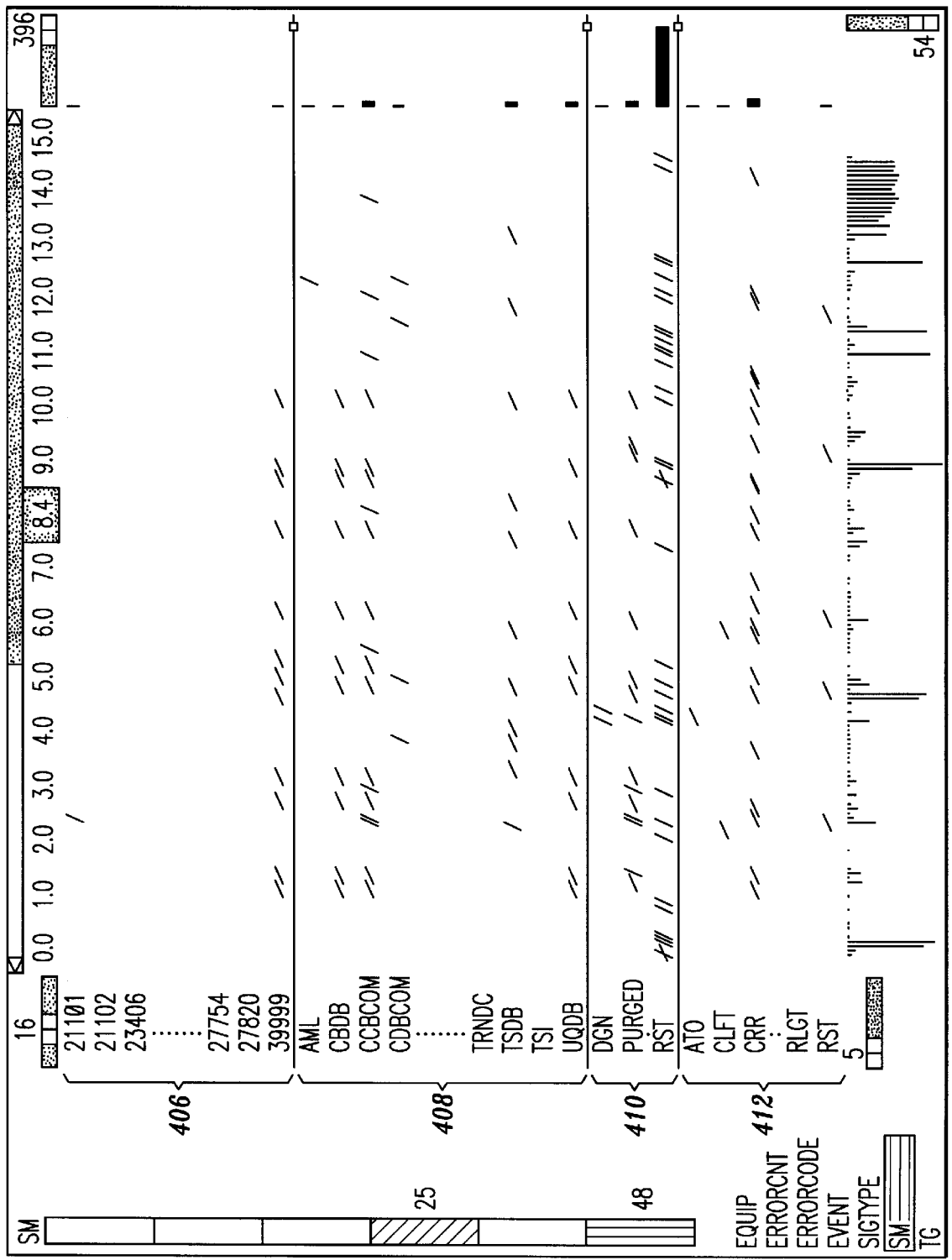
FIG. 4 is a pictorial view similar to FIG. 3 wherein only the reports of selected characteristics of the system under test are shown.

Display 401 of FIG. 4 displays the performance of processor modules SM25 and SM48 alone. Processor module SM25 has the lighter gray tick marks, light green on a color display, that are more vertically oriented. Processor module SM48, on the other hand, has the darker tick marks, red on a color display, that are more horizontally oriented. Processor module SM25 has a burst of report activity of various types about two and one half hours into the test and a reasonably steady stream of ISANBUS audit reports over the entire 15 hours of the test. Processor module SM48, on the other hand, has a report pattern that is very similar to the report pattern exhibited by processor module SM23. This similarity may indicate an inter-module fault between processor modules SM23 and SM48.

Display 401, with most of the reports turned off, exhibits another correlation. There is a definite correlation between assert row 39999 reports and the "waves" of audits occurring at the same time as the row 39999 reports. A "wave" is indicated by a nearly vertical sequence of several types of reports. Additionally, a process was also purged, band 410 row type PURGED, and numerous trunk-errors occurred, band 412 type CRR. Again, processor module SM23 had a very similar report pattern, thus further indicating that an inter-module fault occurred between SM23 and SM48.

Figure 5:
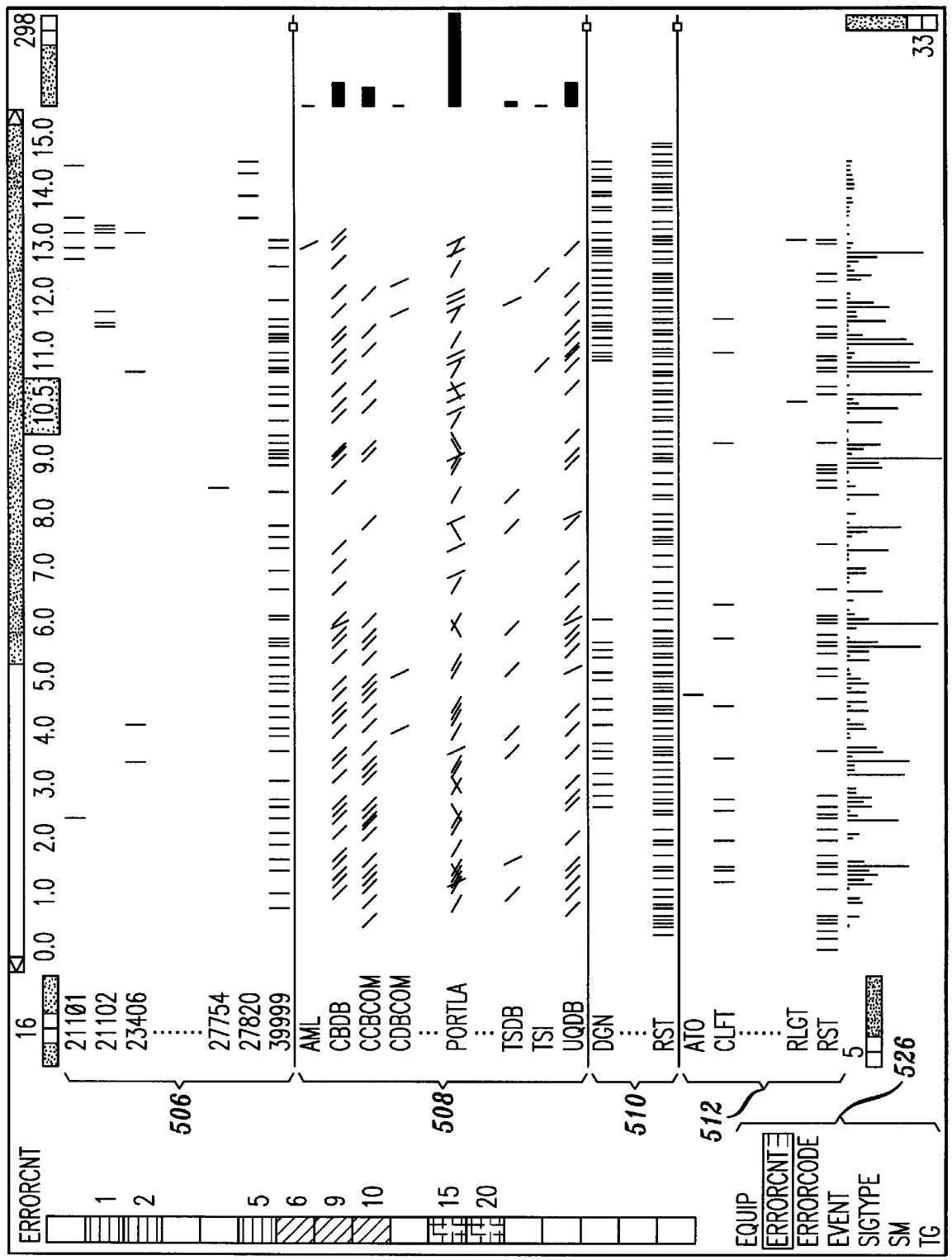
FIG. 5 is a pictorial view similar to FIG. 3 wherein only reports related to system database integrity checkers and correctors according to problem count are shown.

Referring now to FIG. 5, the error count secondary attribute is selected from the set of attributes 526, which is essentially the same as 226 in FIG. 2 but with ERRORCNT highlighted instead of SM. The error count secondary attribute is selected to analyze the reports because of the large number of audit reports. Each audit process checks global data and corrects inconsistencies. If such an inconsistency is found, an error-count for that process is incremented. FIG. 5 shows the audit reports inclination and gray shade coded (to represent their respective colors) by their respective ERRORCNT attributes. Since only audits have an ERRORCNT attribute, only the audit tick-marks are shown with their respective inclinations and gray shades. The tick-marks of the assert band 506, operations-and-maintenance band 510, and trunk-error band 512 all turn black in shade and vertical in inclination to indicate that they are not defined in this operating mode.

Display 501 shows that most audits of band 508 found only small numbers of errors, as shown by the blue tick marks. The exception being the PORTLA audit, which is the most-frequently occurring one. PORTLA consistently found high numbers of errors in the log file. This is shown in the corresponding color figure by its green tick marks.

Figure 6:
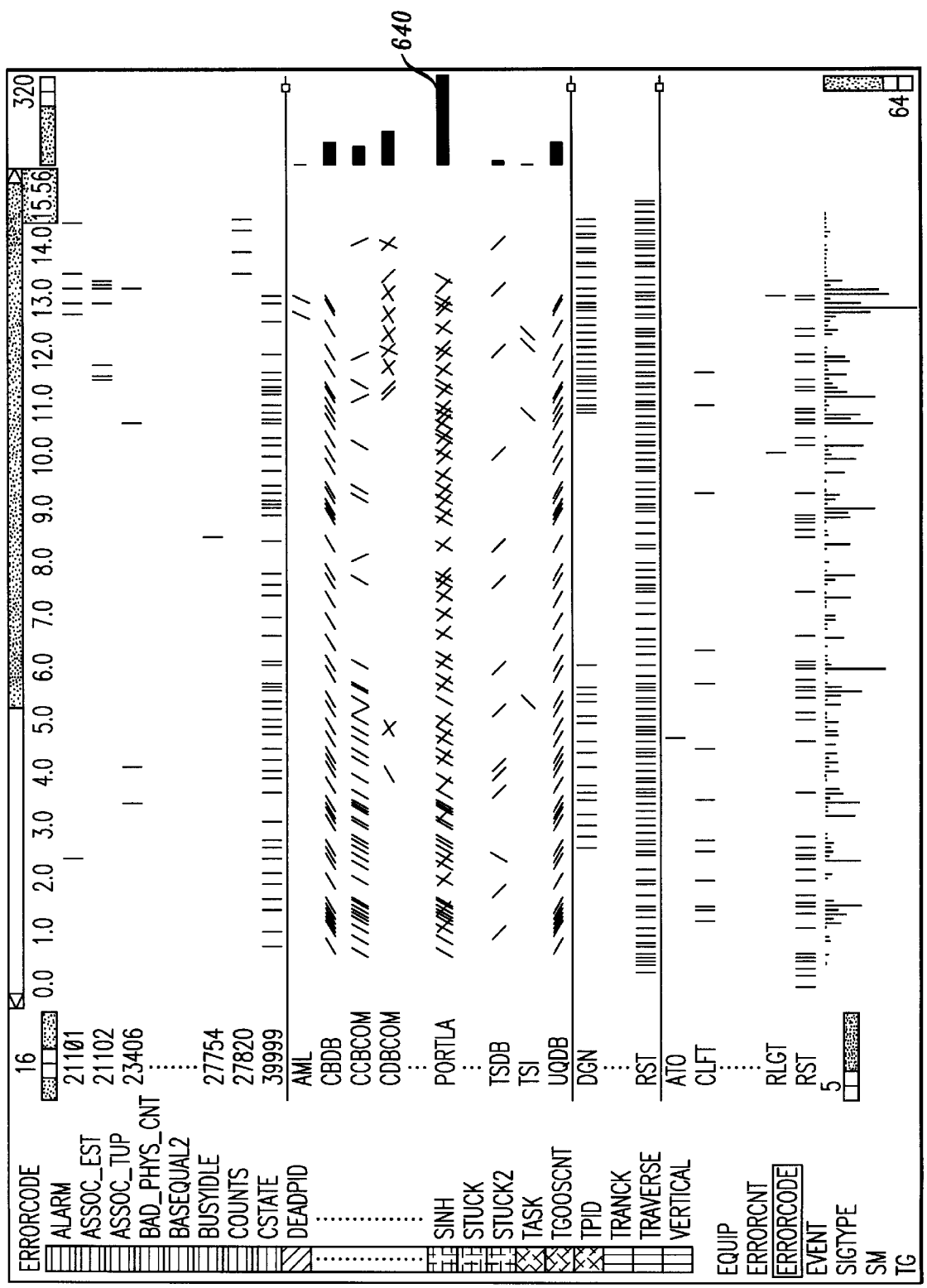
FIG. 6 is a pictorial view similar to FIG. 3 wherein only reports related to system database integrity checkers and correctors according to problem code are shown.

Referring now to FIG. 6, display 601 shows the ERROR-CODE attributes of the log-file reports. Display 601 shows the audit reports inclination and gray shade coded according to their respective ERRORCODE attributes. It can readily be seen from display 601 that the error-codes for the majority of audits are the same for the entire 15 hours of the test because the tick-marks all have the same inclination angle. Here, inclination angle within each row is perhaps more effective than gray shade or color because, while adjacent error-codes have shades or colors that are very close, they do not have inclination angles that are close.

In display 601, as previously in display 501, the PORTLA audit is an exception. The cross-hatching visible is due to multiple tick marks with various inclinations. This cross hatching pattern indicates that there are multiple problems that triggered this same audit. This is also why PORTLA was the most frequently-occurring audit, as shown by bar graph 640.

Figure 7:
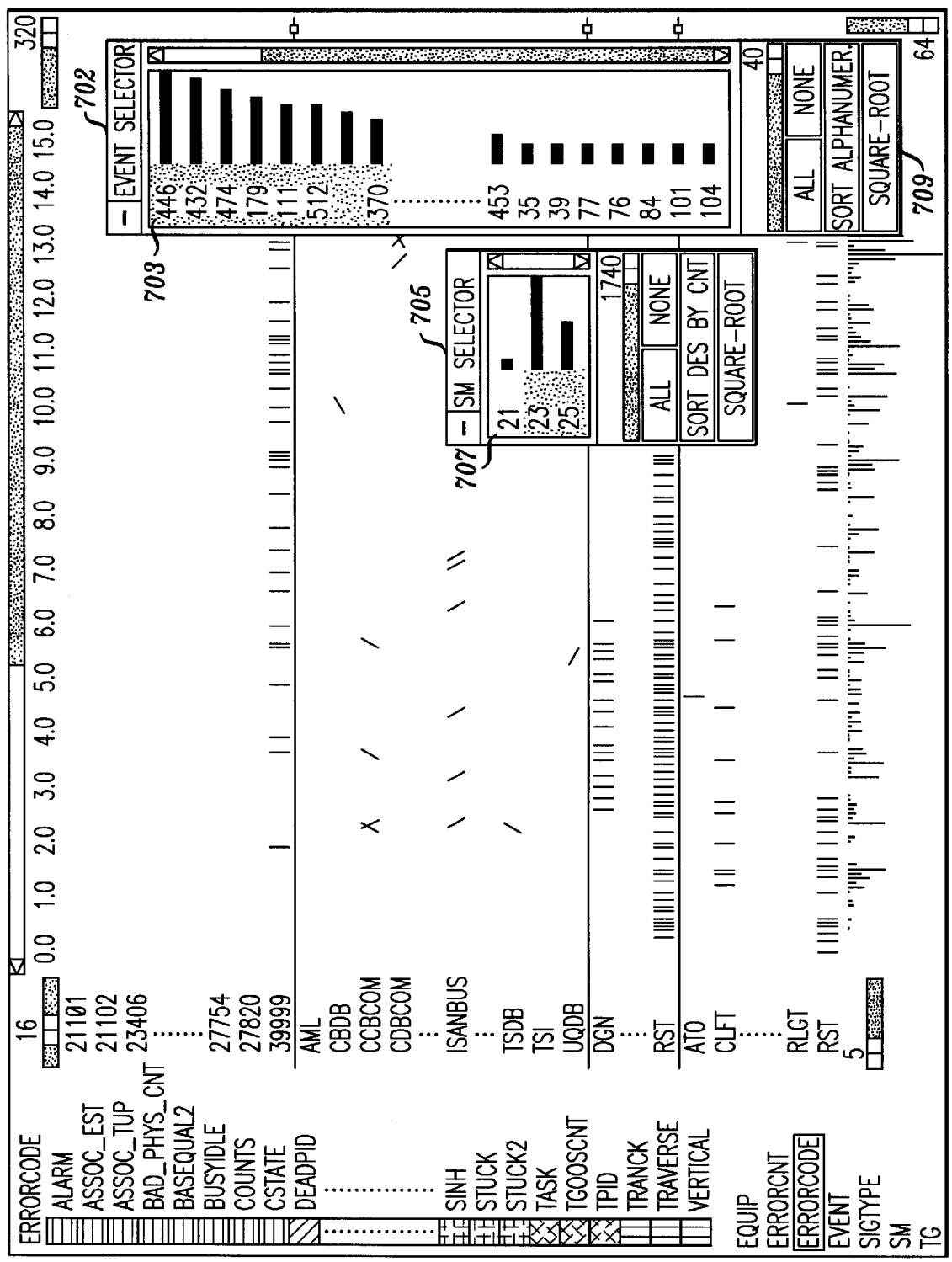
FIG. 7 is the same as FIG. 6 with a selector window overlaying part of the display.

Often, as is the case with this log-file, there are many problems. It would therefore make sense to focus our attention to those problems that are causing the most faults. For software faults, the 5ESS assigns an event number to a sequence of related fault reports. For example, each occurence of the assert 39999 and its audit waves share the same event number. This fact allows us to select only those events having the greatest number of associated reports. FIG. 7 is the same as FIG. 6 but now using selectors. A selector is a pop-up window that allows values of an attribute to be turned off in the same manner as the color scale. A selector also has a bar-chart that shows the total number of occurrences for all the values.

In FIG. 7, selector 701 on event-number has its values sorted in descending order by count. Of those, only those values that occur the most frequently are left on. This is accomplished by clicking 707 none and using keyboard 109 or mouse 111 for selecting the topmost events. This shows only those faults having the greatest number of associated reports. Of those, we would like to focus our attention on SM23 and SM25 because those are the two SMs on which there were the most faults. (Although this information was shown in a previous figure, this information is also shown by the length of the bars 707 in the SM-selector pop-up window 705.) The effect of using selectors 701 and 705 alters the display such that the tick marks corresponding to the selected reports are displayed.

Figure 8:
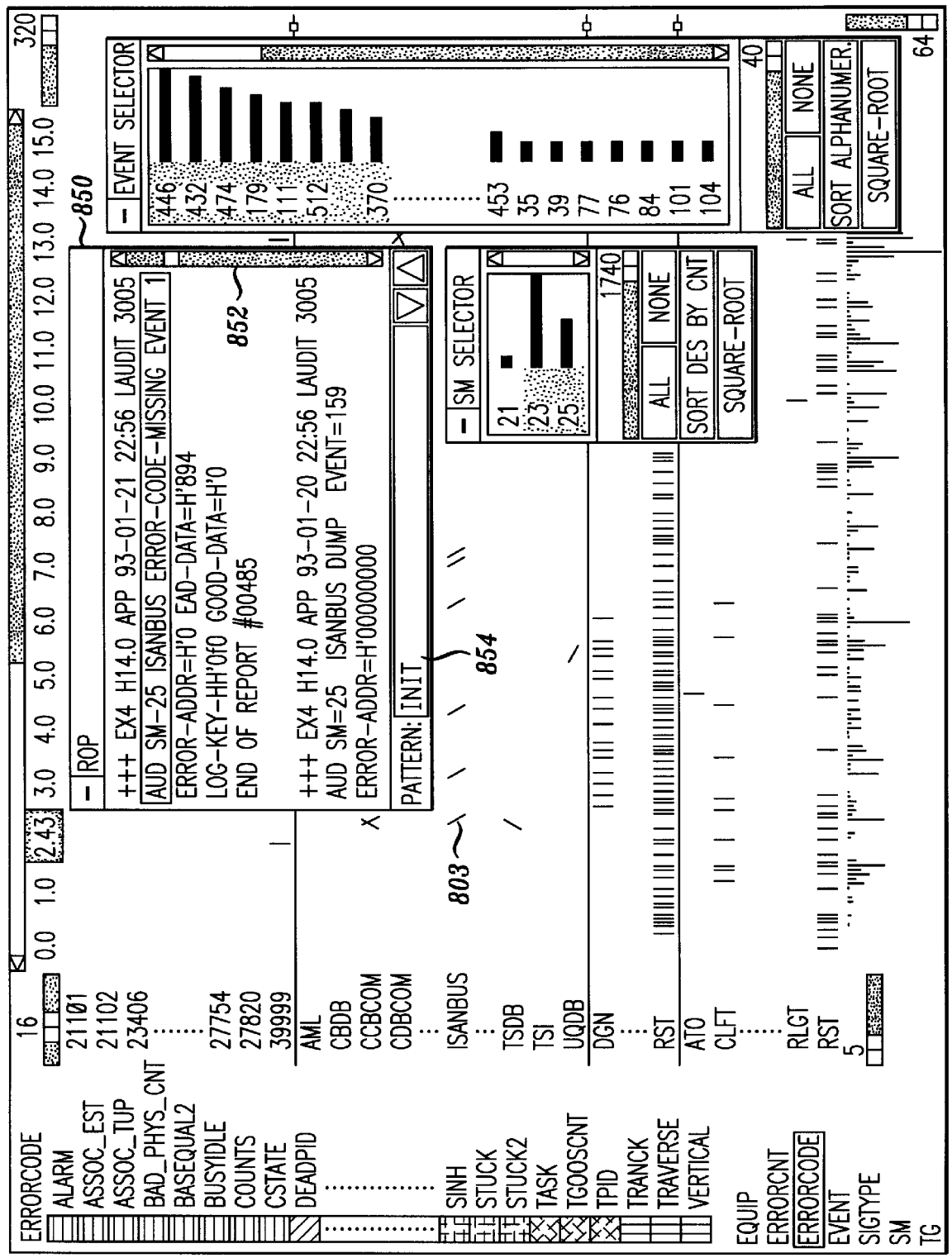
FIG. 8 is the same as FIG. 7 with a browser window overlaying part of the display.

Referring now to FIG. 8, display 801 is the same as display 701 except for browser window 850. If more information is desired to confirm a hypothesis regarding a particular problem that has been visually analyzed, it may be necessary to go back and look at the original log-file; to browse through the text of the report in order to look for additional details that are not displayed otherwise. For example, take the occurrence of the first ISANBUS audit at about two and two thirds hours into the test, the operator might want to look at and around the original report for something interesting. Clicking mouse 111 on tick-mark 803 corresponding to the ISANBUS audit pops-up browser window 850 with the report from the log-file centered in it. The color-coding of the lines of text in the log-file matches the colors in the color scale. The scroll-bar 852 in the browser window 850 allows the operator to browse among the reports nearby in the log-file. Browser window 850 also has a pattern search text field 854 where the operator may type one or more alphanumeric characters, such as the keyword INIT, and search forward or backward in the log-file for match.

Figure 9:
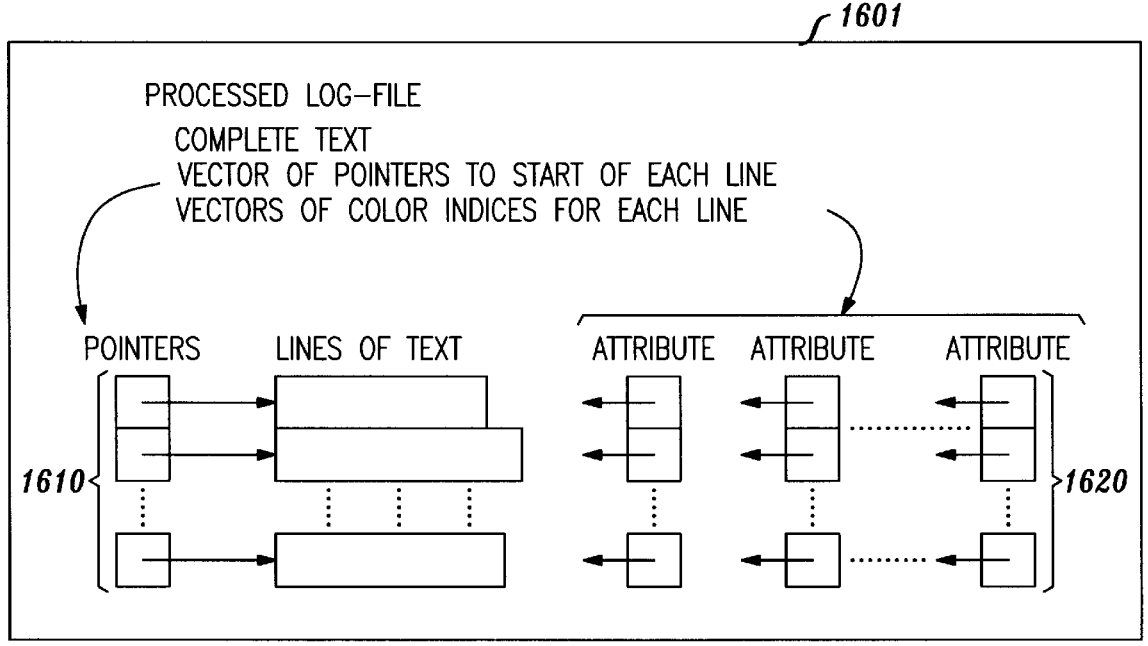
FIG. 9 is a detail of a processed log-file in memory.
Figure 10:
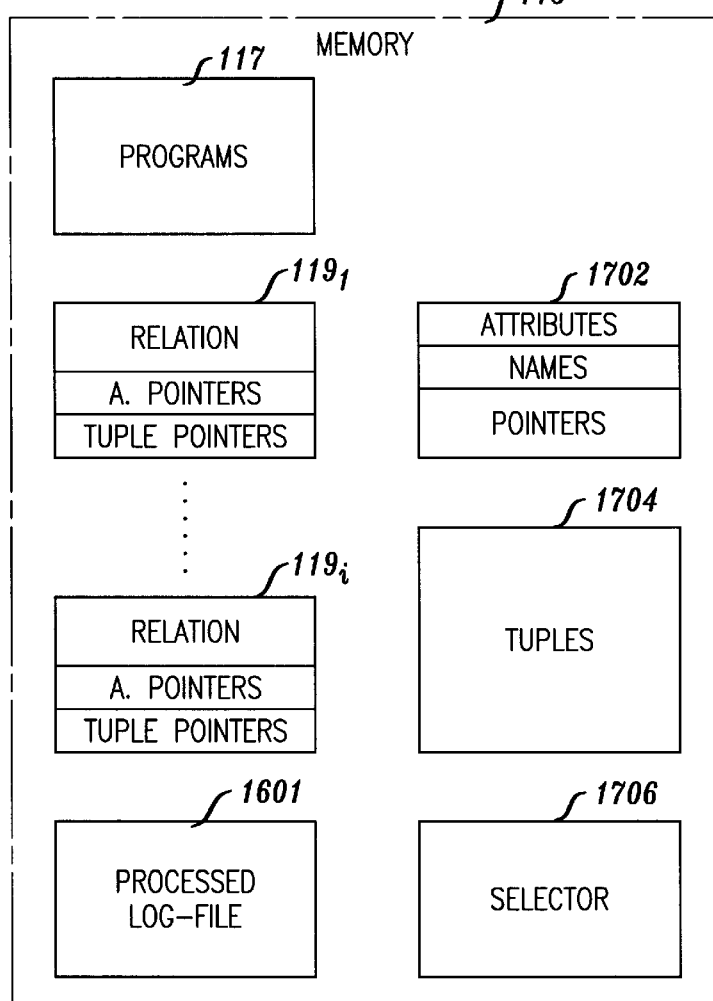
FIG. 10 is a detail of data structures in memory.

Referring now to FIGS. 1, 9 and 10, the method of obtaining displays 201–801 from the log file will be described. Initially, a log-file of a system is stored in mass storage 120. The log-file is subsequently read into memory 115 where it is processed by processor 113 according to program 117 into a relational database of selected portions of the time stamped reports that make up the log-file. As the log-file is read in and processed, relations $119_1$–$119_i$ are stored in memory 115. For example, the asserts, audits, operations-and-maintenance reports, and trunk-error reports are four of the relations that are stored.

Figure 11:
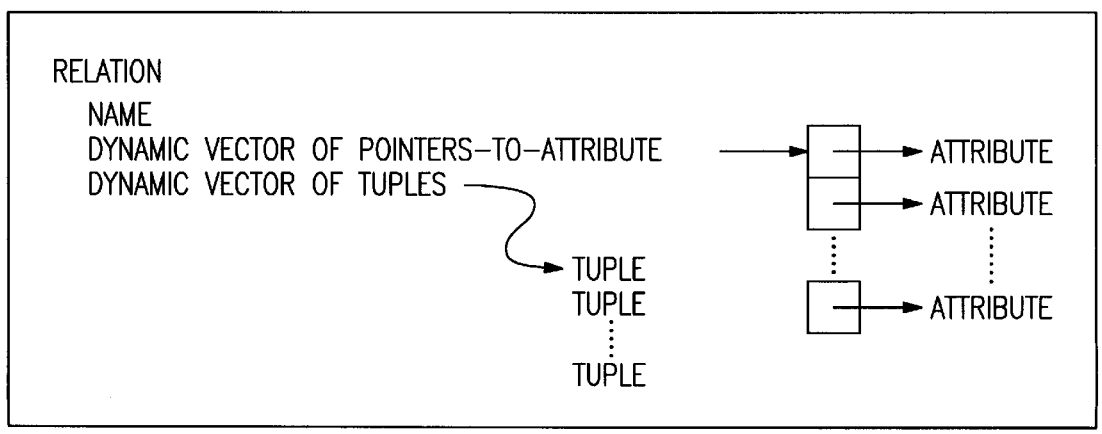
FIG. 11 is a detail of a relation in memory.

Each relation $119_1$–$119_i$ has a descriptor file which contains the names of its attributes. So, these attributes describe a relation. The relations and attributes are associated as the attributes are read into memory area 1702. The relations identify those attributes that they use, and store attribute pointers to each attribute used by the relation (see FIG. 11). If two relations use the same attribute, only one entry is made in area 1702, and each relation has a pointer to that entry. Similarly, as the log-file is read in, the tuples are stored in memory area 1704 and the relations identify those tuples that they use and store tuple pointers to each.

Figure 12:
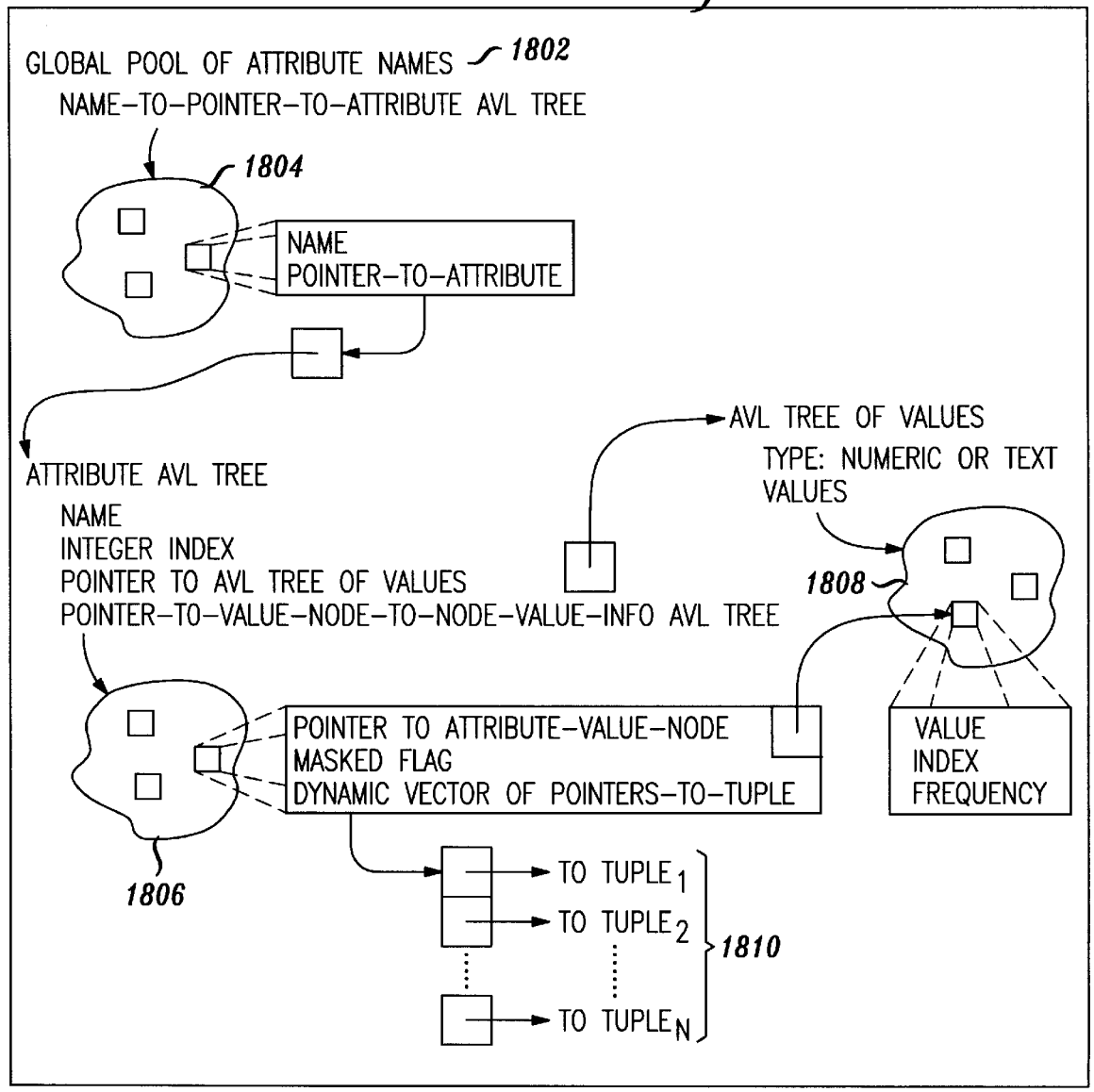
FIG. 12 is a detail of global pool of attribute names in memory.

FIG. 12 illustrates the data structures stored in the attribute area 1702 in detail. First, there is a global pool of attribute names 1802 where each attribute name is associated with a pointer to the named attribute by means of an AVL tree 1804. Each attribute entry has a name, an associated integer index of the attribute AVL tree 1804, a pointer to an AVL tree of values 1808 and a pointer-to-value-node-TO-node value information AVL tree 1806. The AVL tree of values 1808, which stores all of the values of said attribute, either numeric or textual. Each value within AVL tree of values 1808, has the value itself is stored, a sequential index of each value is stored, and the number of occurrences or frequency of each value is stored.

Attribute AVL tree 1806 also stores for each attribute a pointer to Attribute-value-node, a masked/not masked flag, and a dynamic vector of pointers-to-tuples having said attribute.

Figure 13:
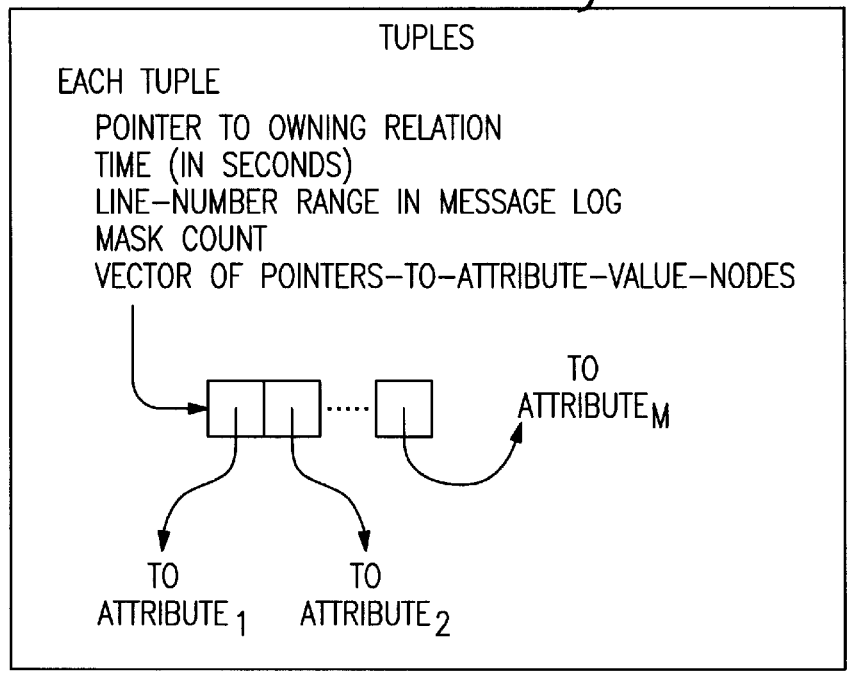
FIG. 13 is a detail of tuples in memory.

Referring now to FIG. 13, the details of data structures stored in the tuple area 1704 will be described. A tuple by definition is a set of values of related attributes, IEEE Std. 100-1992. Each tuple is owned by one and only one of the relations $119_1$–$119_i$. Each tuple has a pointer back to it owning relation, a time in seconds from the beginning of the log-file, a line number range in the log corresponding to the message that the tuple represents, a mask count (which is necessary because a tuple may be masked by multiple selectors, yet only one mask is necessary to prevent display of a value), and a vector of pointers-to-Attribute-value-nodes rather than redundantly storing the values themselves.

Figure 14:
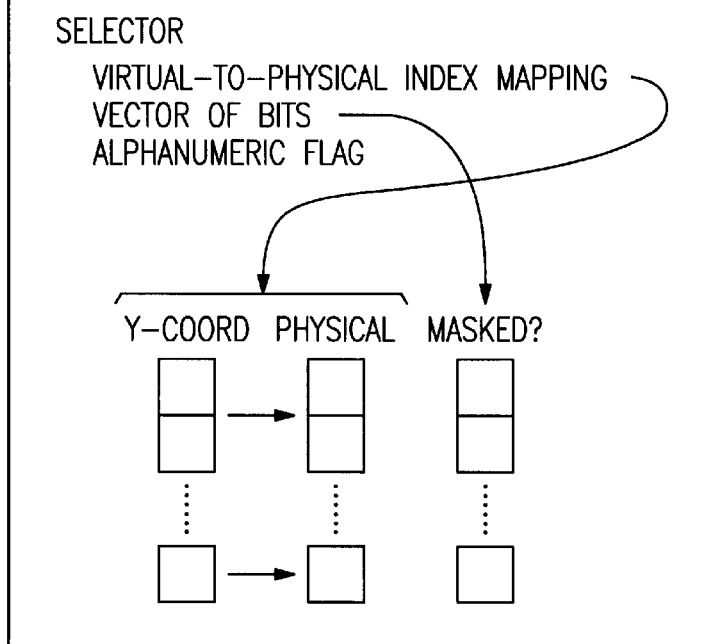
FIG. 14 is a detail of a selector in memory.
Figure 17:
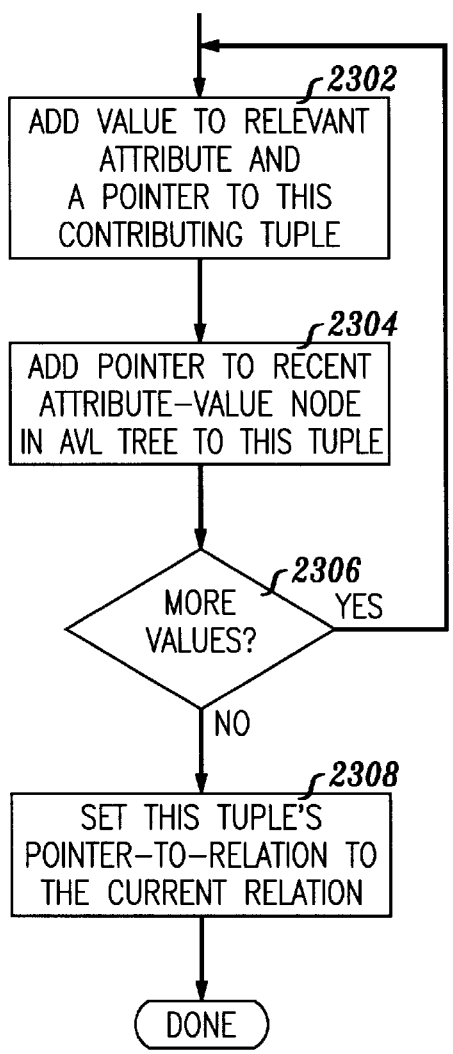
FIG. 17 is a detail of a procedure that processes tuples.

Referring to FIGS. 17 and 14, a selector area 1706 of memory 115 stores data structures used by the selector windows, as shown in FIG. 7. The selector area 1706 stores a mapping of virtual coordinates of attribute values within the window to physical coordinates of data within the display 701. This is necessary when the values are sorted in decending order by count. With each value is a masked/not masked bit and a flag indicating whether the sorting is currently alphanumeric. The virtual coordinates are the coordinates of the values in an ascending order, i.e. the position coordinates of the value if no sorting were performed within the selector window. The actual coordinates are the coordinates of the values displayed within the selector window after a sort has performed. This mapping is necessary in order to be able to reference the correct value when selecting a sorted value item within a selector window with mouse 111.

Figure 15:
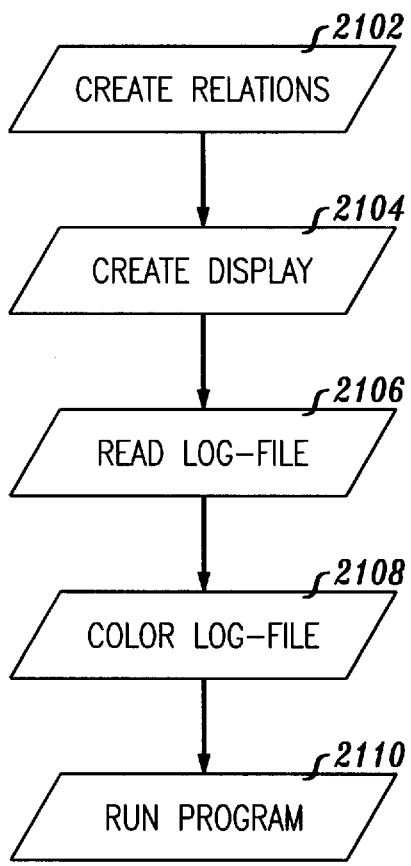
FIG. 15 is an overview of a process that produces a display according to the invention.

FIG. 15 is a diagram 2101 showing the processes performed to obtain the data structures just described and to use those data structures to produce a display, such as display 201 or display 701. The create-relations procedure 2102 creates the relations $119_1$–$119_i$. It operates on a log-file that has been processed into a relational database form.

Figure 16:
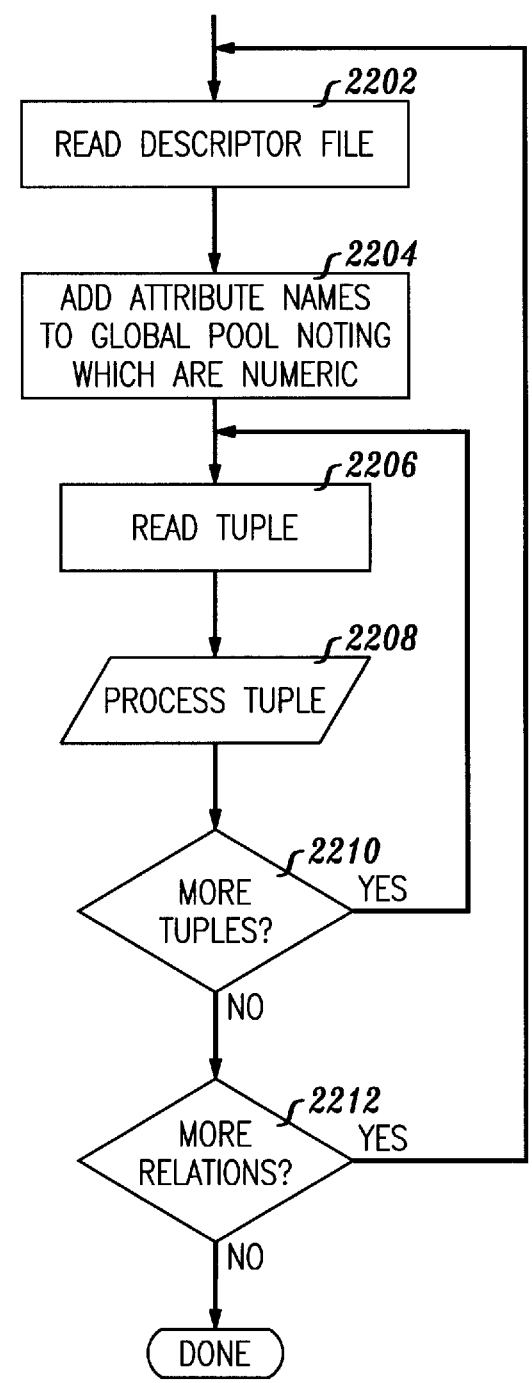
FIG. 16 is a detail of a procedure that produces relations.

Referring now to FIG. 16, the create-relations procedure 2102 starts processing with the first relation $119_1$ of relations $119_1$–$119_i$ and action 2202 reads the descriptor file of the first relation $119_1$. Next, action 2204 adds attribute names of the descriptor file to global pool of attribute names 1802 and also noting which attributes are numeric in character. After action 2204, action 2206 reads a tuple from the log-file database. Next, procedure 2208 processes a tuple of the current relation, as explained below in FIG. 17. After action 2208, action 2210 checks to see if there are more tuples of the current relation to be processed. If the answer is yes, process 2102 returns to action 2206 to read another tuple of the current relation. If the answer is no, that means all the tuples of the current relation have been processed and process 2102 proceeds to action 2212. Action 2212 checks to see if there is another relation of the relations $119_1$–$119_i$ to be created. If the answer is yes, process 2102 returns to action 2202 and reads the descriptor file of a next relation of relations $119_1$–$119_i$ to be created. If the answer is no, that means that process 2102 has created all of the relations $119_1$–$119_i$ and the process 2101 can proceed to create display process 2104.

Referring now to FIG. 17, details of the process tuple procedure 2208 mentioned above will be described before describing create display process 2104. Procedure 2208 starts with a tuple of the current relation and proceeds to action 2302. At action 2302, a value of the current tuple of the relevant attribute is added to the global pool of values 1808 for said attribute and a pointer to this tuple is added to the list of tuples 1810. After action 2302, action 2304 adds a pointer that points to the current attribute-value node in the AVL tree to the current tuple. Next action 2306 checks to see if a there is another value of the current tuple to be processed. If there is another value to be processed, procedure 2208 returns to action 2302 to process the next value as it had processed the previous value of the current tuple. If there is not another value to be processed, procedure 2208 proceeds to action 2308. Action 2308 sets the tuple's pointer to point at the current relation as its owning relation and then the processing of this tuple is complete. After procedure 2208 has been performed for each tuple in each relation $119_1$–$119_i$ of the relational database corresponding to the log file, the result is the tuple data structure shown in FIG. 13.

Figure 18:
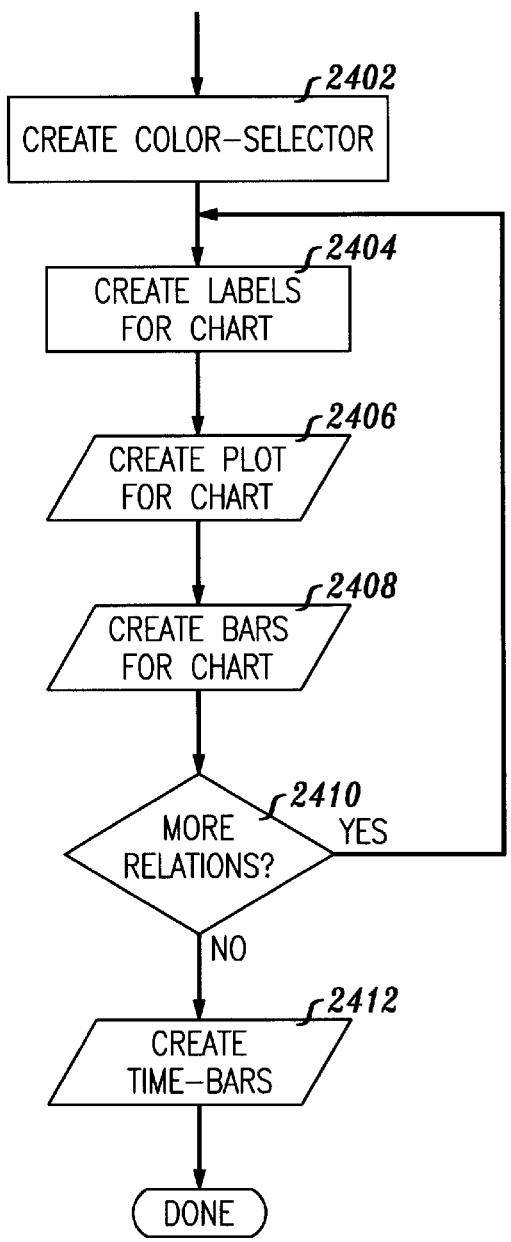
FIG. 18 is a detail of a procedure that produces a display according to the invention.

Referring now to FIG. 18, details of the create-display procedure 2104 will be described. This process creates a display, such as display 201 on display screen 105. Action 2402 creates the color scale selector along the left side of display 201, shown in FIG. 2. Colors blue through red in a progression of hues are assigned based on a distribution over unique values of a given attribute. These colors correspond to the tick-mark colors as part of a graphical association technique. Next, action 2404 creates the labels, i.e. the 'names' or symbols used in the display, for the current relation corresponding to the unique values of the primary keys of said relation. The labels are the 'fixed' part of the display and the remaining portions involve further processing of the relations corresponding to the log-file and their respective data structures mentioned previously.

Action 2406 is a create plot procedure that is described in regard to FIG. 19 below. After action 2406 is action 2408, which is a create bars for chart procedure. Action 2408 is described in regard to FIG. 20 below. After action 2408 is action 2410, which checks to see if there is another relation that needs to be displayed. If there is another relation that needs to be displayed, procedure 2104 returns to action 2404 and proceeds through procedures 2406 and 2408 for the next relation. If there is not another relation to be displayed, then procedure 2104 proceeds to action 2412. Action 2412 is a create time bar procedure, which will be explained below in regard to FIG. 21. This completes the creation of a display, such as display 201, on display screen 105.

Referring now to FIG. 19, the create plot procedure 2406 will be described. Create plot procedure 2406 is entered with a relation already selected by create display procedure 2104. Action 2502 of procedure 2406 accesses a tuple of the current relation. Next, action 2504 adds pointer-to-tuple to list of tuples in quadtree at the point (x,y) determined by the tuple's time and the index of the tuple's value into the attribute along the y-axis. Action 2504 uses data from the database and the tuple data structures shown in FIG. 13. Next, action 2506 checks to see if another tuple needs to be accessed for the create plot for chart procedure 2406. If there is another tuple that needs to be accessed, procedure 2406 returns to action 2502 to access the another tuple of the current relation. If there is not another tuple that needs to be accessed, all tuples of the current relation have been processed for the create plot for chart procedure 2406 and procedure 2406 proceeds to create bars for chart procedure 2408.

Referring now to FIG. 20, create bars for chart procedure 2408 will be described. These bars, bars 214–220 on display 201 of FIG. 2, are the horizontal ones extending from the right vertical axis of the display. As with the previous procedure, create bars for chart procedure 2408 is entered with a relation 119₁–119ᵢ already selected. Action 2602 initializes each of the totals for each bar of the display to zero. After this, procedure 2408 proceeds to action 2604.

Action 2604 checks to see if the current relation has the attribute selected for color-coding. If the current relation does not have said attribute, that means the current display is of an attribute that the relation does not possess and for such a situation no bars are displayed. For example, see band 506 of display 501 in FIG. 5. In this case, the procedure 2408 jumps forward to action 2410 of create display procedure 2104 shown in FIG. 18.

If the current relation does have the attribute selected for color coding, that means that the current display is of an attribute that the relation possesses and that one or more bars might be drawn, in which case the procedure 2408 proceeds to action 2606. Action 2606 access a tuple of the current relation and proceeds to action 2608. Action 2608 checks to see if the accessed tuple is masked. A tuple is considered masked if either the value of the tuple for the attribute being color-coded by has been de-selected by using mouse 111 on display 224 of display 201 in FIG. 2, or the tuple has a non-zero mask count as shown in FIG. 13. If the accessed tuple is not masked, procedure 2408 proceeds to action 2610 which increments the total for the bar corresponding to the accessed tuple and the procedure 2408 proceeds to action 2612. If the accessed tuple is masked, then the procedure 2408 jumps forward to action 2612 and the total for the corresponding bar is not incremented. After action 2610, action 2612 checks to see if there is another tuple of the current relation to access. If there is another tuple to access, procedure 2408 returns to action 2606 to access another tuple. If there is not another tuple to access, then all of the bars for the current relation have been created and procedure 2408 proceeds to action 2410.

Action 2410, as mentioned above with regard to FIG. 18, loops procedure 2104 back in order to process another relation for chart labels, plots and bars. After all of the relations 119₁–119ᵢ have been through actions 2402–2410, then the create display procedure 2104 proceeds to create time bar process 2412.

Figure 21:
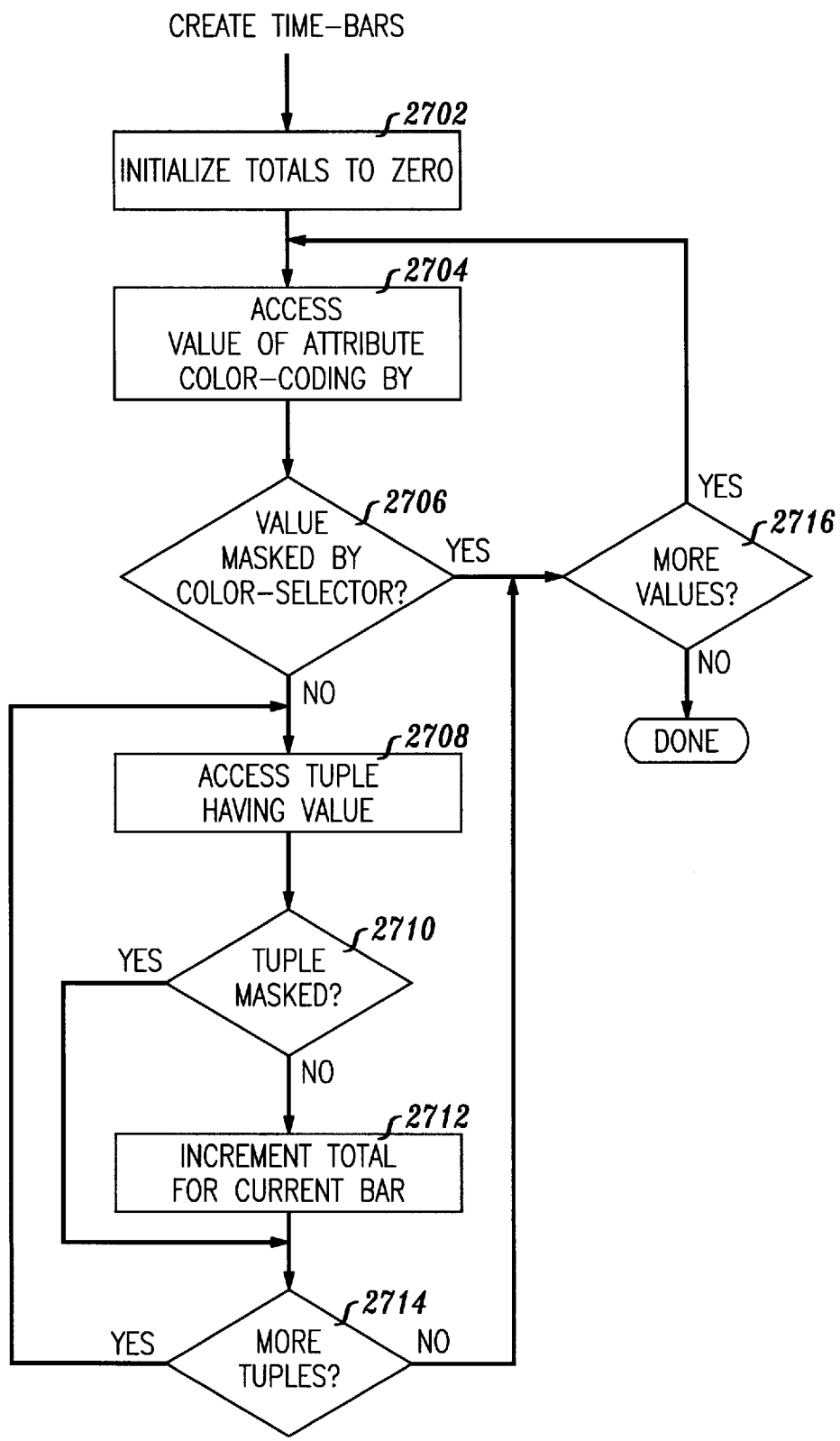
FIG. 21 is a detail of a procedure that produces time-bars.

Referring now to FIG. 21, the create time bar procedure 2412 will be described. The create time bar procedure 2412 is independent of individual relations and is taken over all tuples. Action 2702 at the beginning of procedure 2412 initializes all time bar totals to zero. Next procedure 2412 proceeds to action 2704 where a value of the attribute that is being color coded by is accessed. Next, action 2706 checks to see if the accessed value is masked by the color selector. If the accessed value is masked, then this value will not contribute to a time bar and the procedure jumps forward to action 2716, which will be explained below. If the accessed value is not masked, then this value will contribute to a time bar and procedure 2412 proceeds to action 2708.

Action 2708 accesses the tuple having the accessed value. Next, action 2710 checks the accessed tuple to see if this tuple is masked. If this tuple is masked, then the procedure 2412 jumps forward to action 2714 and this tuple does not contribute to the current time bar. If this tuple is not masked, then procedure 2412 proceeds to action 2712 where the current time bar total is incremented before proceeding to action 2714. The relevant time bar is determined by dividing the tuple's time in seconds by the current time interval length.

Action 2714 checks to see if there is another tuple having the accessed value. If there is another tuple having the accessed value, then procedure 2412 returns to action 2708 to process said tuple. If there is not another such tuple, then procedure 2412 proceeds to action 2716. Action 2716 checks to see if there is another value to process. If there is another value to process, procedure 2412 returns to action 2704 to process this value. If there is not another value to process, then procedure 2412 has completed all of the time bars and the create display procedure 2104 is completed. At this point, the data for every part of the display 201 has been created except for the tick marks, which is described in FIG. 25. But, to create part of the special display 701, procedures 2106 and 2108 are needed.

Figure 22:
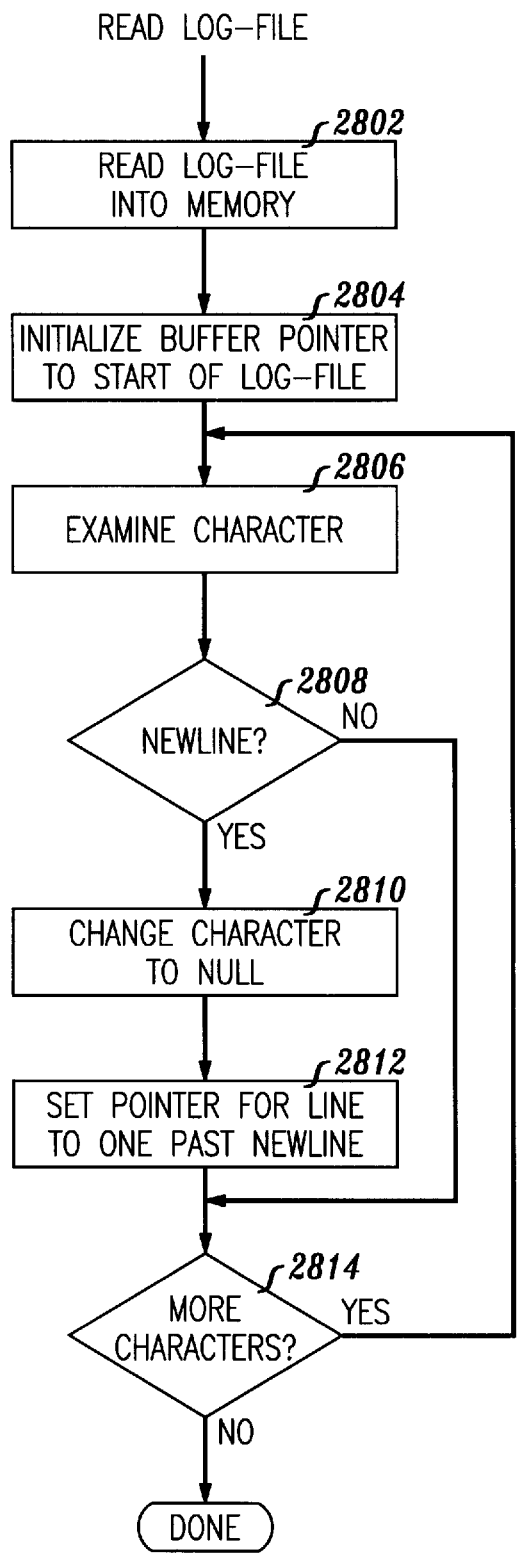
FIG. 22 is a detail of a read log-file procedure.

Referring now to FIG. 22, a read log-file process 2106 will be described. This is a process for use in a browser window. Action 2802 reads the log file into memory 115. Next, action 2804 initializes a buffer pointer at the start of the log-file in memory. Next, action 2806 examines the character at which the buffer pointer is pointing. This examination determines if the character is a newline character or some other character and then procedure 2106 proceeds to action 2808. Action 2808 checks to see if the character the buffer pointer is pointing to is a newline character. If it is not a newline character, the procedure 2106 jumps forward to action 2814. If the character the buffer pointer is pointing to is a newline character, then procedure 2106 proceeds to action 2810.

Procedure 2106 reaches action 2810 because a new line of text has started as signified by the newline character. Action 2810 changes the newline character to the null character to terminate the line of text in memory. Next, action 2812 sets the pointer for the line 1610 to one past the newline character, i.e. at the start of the new line of text and proceeds to action 2814. Action 2814 checks to see if there is another character to be examined. If there is another character to be examined, procedure 2106 returns to action 2806 to examine another character. Procedure 2106 will loop back in this manner until the start of each new line has been stored in memory 115 and there are no more characters in the log-file to be examined. At this point, overall procedure 2101 proceeds to procedure 2108.

Figure 23:
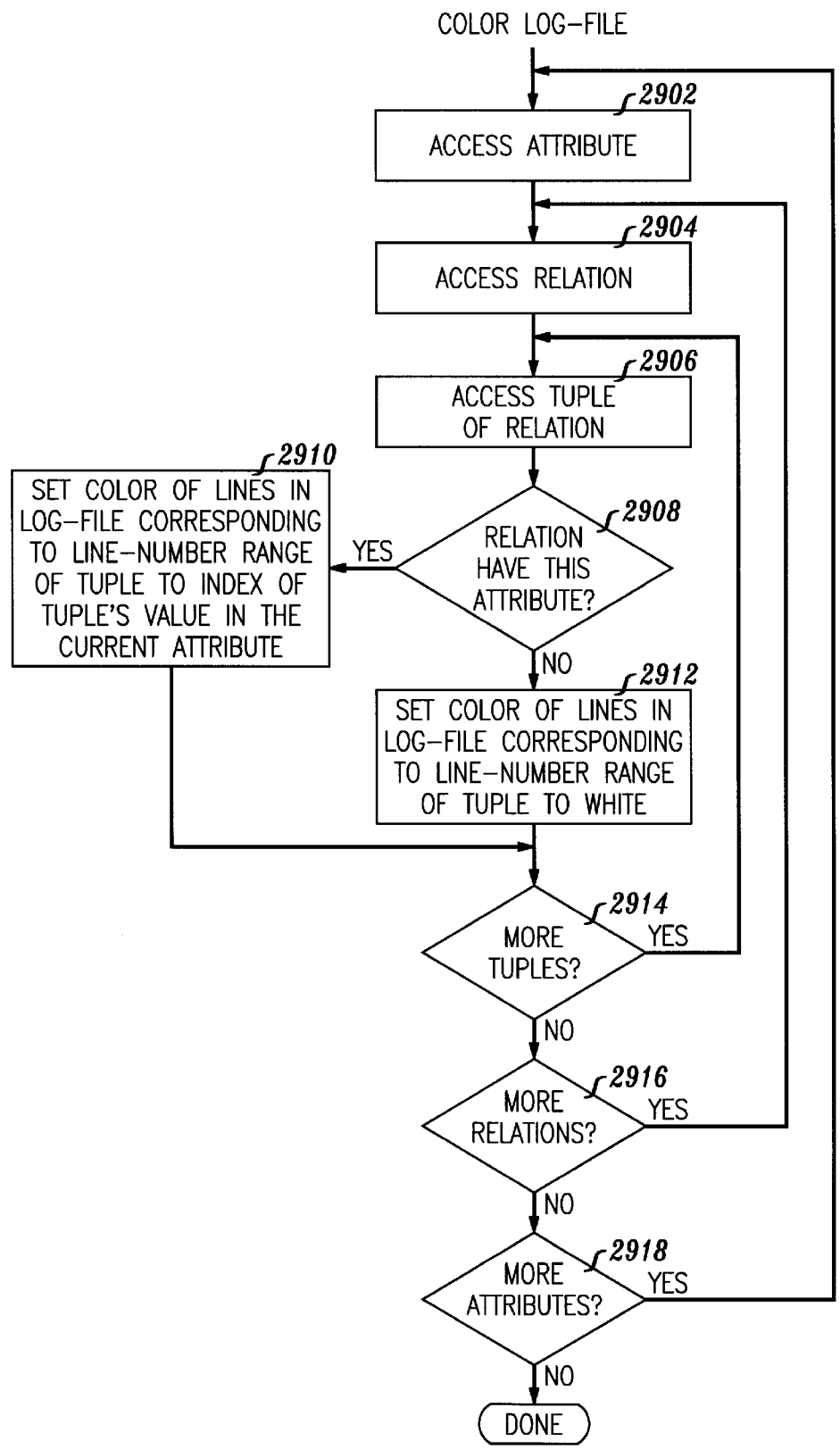
FIG. 23 is a detail of a color log-file procedure.

Referring now to FIG. 23, color log file procedure 2108 will be described. This procedure sets the color of the log file text to the same colors as the tuples displayed on the screen 105 as a visual device that confirms to the operator that the log file report brought up in a browser window 850, as seen in FIG. 8, by pointing the pointer 107 and clicking a button of the mouse 111 is related to the tick-mark clicked on in the display.

Action 2902 is the first action and this action accesses an attribute. Next, action 2904 accesses a relation. Next, action 2906 accesses a tuple of the accessed relation. After action 2906, action 2908 checks to see if the accessed relation has the accessed attribute. If the accessed relation does not have the accessed attribute, procedure 2108 proceeds to action 2912 which sets the color indices 1620 corresponding to the line number range for the current tuple to white and proceeds to action 2914. If the accessed relation does have the accessed attribute, procedure 2108 proceeds to action 2910 which sets color indices 1620 corresponding to the line number range for the current tuple to the index of the tuple's value in the current attribute and proceeds to action 2914.

Action 2914 checks to see if there is another tuple of the relation to be accessed. If there is another tuple, then the procedure 2108 returns to action 2906 to access this other tuple to check for the current attribute. If there is not another tuple of this relation, procedure 2108 proceeds to action 2916 which checks to see if there is another relation. If there is another relation, procedure 2108 returns to action 2904 to access the relation to check the tuples thereof for the attribute. If there is not another relation to check, procedure 2108 proceeds to action 2918 to check if there is another attribute to be accessed. If there is another attribute to be accessed, procedure 2108 returns to action 2902 to access this other attribute to see if it the relations of the current relation have this attribute. If there is not another attribute to access, that means that all the attributes have been accessed and all of the log-file lines have had color coding set and stored either to the color of their respective tuple's values or to white.

Figure 24:
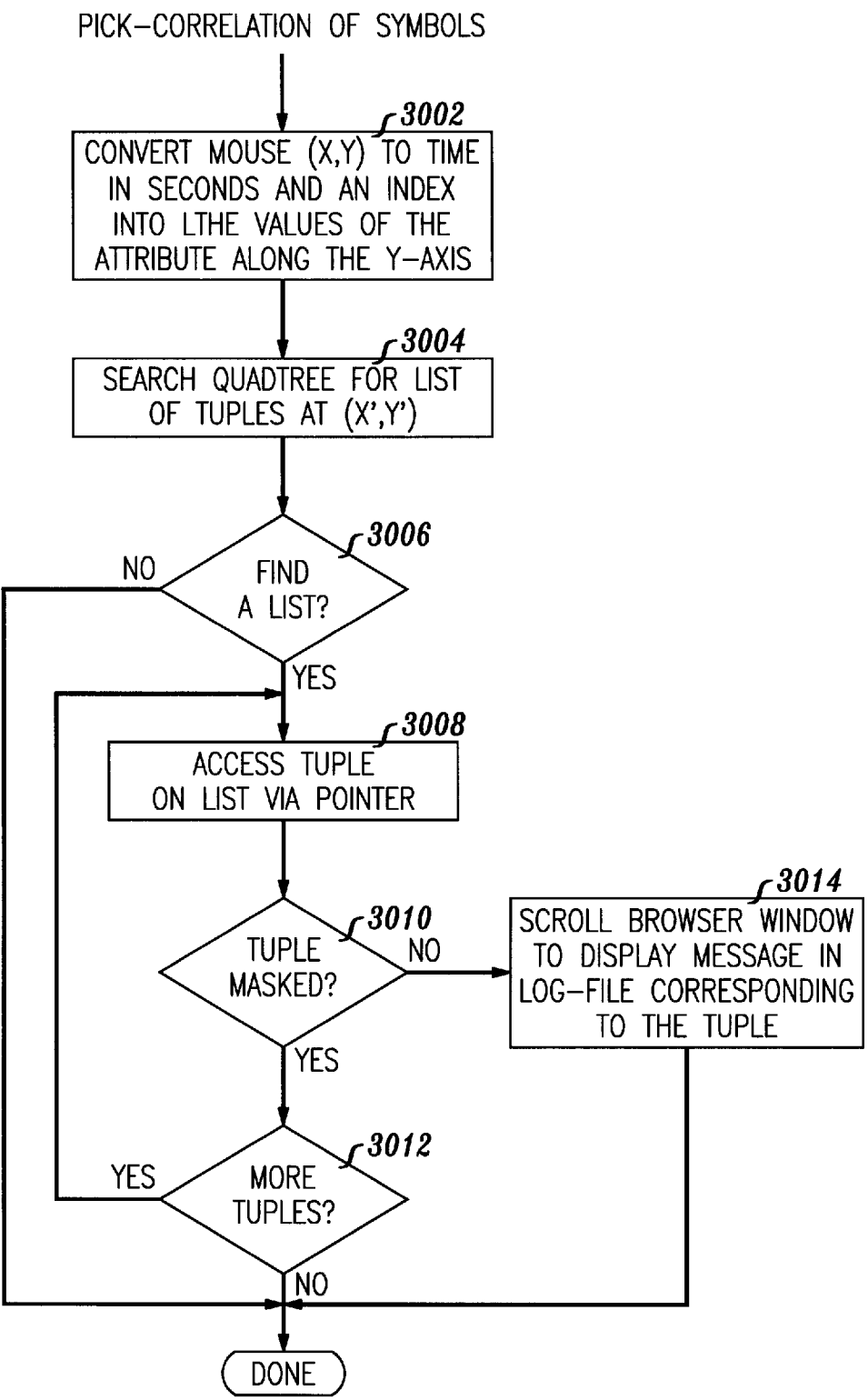
FIG. 24 is a detail of a procedure that pick-correlates symbols.

Referring now to FIG. 24, a pick correlation procedure 3001 will be described. Pick correlation of symbols procedure 3001 is used to allow the operator to interact with the display via the pointer 107 and the mouse 111. Action 3002 converts mouse physical coordinates (x,y) to time in seconds, i.e. the horizontal axis, and an index into the values of the attribute along the y-axis. Next, action 3004 takes the converted coordinates (x',y') and searches a quadtree list for a list of tuples at said coordinates. After action 3004, action 3006 checks to see if the search found a list of tuples at (x',y'). If no list was found, procedure 3001 is done and correlation process is finished, i.e. no correlation resulted.

If a list of tuples is found, action 3008 accesses a tuple on the list via a pointer and procedure 3001 proceeds to action 3010. Action 3010 checks to see if the accessed tuple is masked. If it is masked, procedure 3001 proceeds to action 3012 which checks to see if there is another tuple on the list. If there is, procedure 3001 returns to action 3008 to access and check for masking of this tuple. If there is not another tuple, procedure 3001 terminates. If the tuple accessed by action 3008 is not masked, the procedure 3001 proceeds from action 3010 to action 3014. Action 3014 is the desired result, from the operators point of view, for action 3014 interactively scrolls a browser window 850 to display the report in the log-file that corresponds to the tick mark 803 clicked on with mouse 111.

Figure 25:
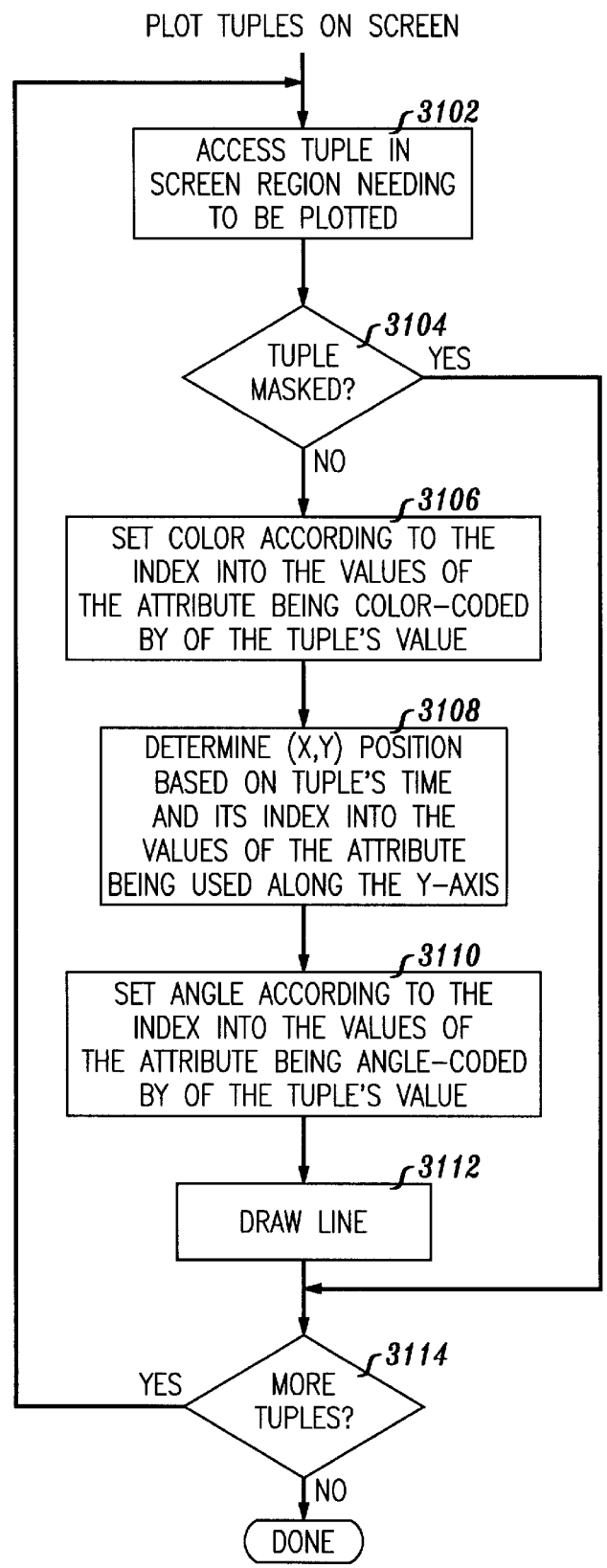
FIG. 25 is a detail of a procedure that plots tuples on the screen.

Referring now to FIG. 25, procedure 3101 of plotting of tuples on the screen 105 will be described. Action 3102 accesses a tuple on the display to be plotted. Next, action 3104 checks to see if this tuple is masked. If this tuple is masked, procedure 3101 jumps to action 3114 to search for another tuple. If this tuple is not masked, procedure 3101 proceeds to action 3106. Action 3106 sets the color according to the index of the tuple's value into the values of the attribute being color-coded by. Next, action 3108 determines the (x,y) position based upon the tuple's time and its index into the values of the attribute being used along the y-axis. Next action 3110 sets the angle of inclination of a to-be-drawn tick-mark according to the index of the tuple's value into the values of the attribute being angle-coded by. Next, action 3112 draws the inclined and color coded line centered at the (x,y) position on screen 105. After, action 3112, procedure 3101 proceeds to action 3114 which checks to see if there is another tuple to possibly plot. If there is another tuple, procedure 3101 returns to action 3102 for this next tuple. If there is not another tuple, all of the tuples have been plotted on the screen 105 and the process 3101 is completed.

Referring back to FIG. 15, procedure 2110 is the run program process, which forms various displays from all of the graphical data that has been created and stored by procedures 2102, 2104, 2106, and 2108. In addition, the run program procedure 2110 uses procedures 3001 and 3101 to provide the operator with an interactive graphical display for analyzing a log-file.

An apparatus according to the present invention enables an operator to quickly find and isolate interesting messages within a processor system, even a distributed processor system. Further, because the interesting messages are discovered so rapidly, the invention enables the operator to find second-level messages, some of which might not be discoverable with the previous text based techniques.

Thus, it will now be understood that there has been disclosed a method and apparatus for graphically analyzing a system log file. While the invention has been particularly illustrated and described with reference to preferred embodiments thereof, it will be understood by those skilled in the art that various changes in form, details, and applications may be made therein. For example a distributed computer system instead of a distributed switching processor system. It is accordingly intended that the appended claims shall cover all such changes in form, details and applications which do not depart from the true spirit and scope of the invention.

What is claimed as new and desired to be secured by Letters Patent of the United States is:

1. Apparatus comprising:

means for originating a plurality of time-stamped messages, each message having a set of characteristics;

means for visually displaying a plurality of symbols, each symbol corresponding to a respective message of said plurality of messages;

each symbol having an appearance that varies according to a first characteristic of the set of characteristics of its respective message;

each symbol having a position that is determined by the time-stamp and a second characteristic of the set of characteristics of its respective message; and means for displaying the message corresponding to any symbol.

2. The apparatus according to claim 1, wherein values of said characteristic are monotonically ordered.

3. The apparatus according to claim 1, wherein:

each symbol is a line-segment of varying inclination and varying color.

4. The apparatus according to claim 1, wherein:

each symbol is a line-segment varying in inclination, color and texture.

5. The apparatus according to claim 1, wherein:

each symbol is a geometric shape varying in color.

6. The apparatus according to claim 1, wherein:

each symbol is a geometric shape varying in texture.

7. The apparatus according to claim 1, wherein:

each symbol is a geometric shape varying in color and texture.

8. The apparatus according to claim 1, further comprising means for searching the message for a textual pattern.

9. The apparatus according to claim 1, further comprising means for displaying a total of occurrences of messages of a specific type.

10. The apparatus according to claim 9, wherein said time interval is adjustable.

11. The apparatus according to claim 1, further comprising means for displaying a total of all messages time stamped within a time interval.

12. The apparatus according to claim 11, wherein said time interval is adjustable.

13. The apparatus according to claim 1, further comprising means for displaying a selector window that allows selected values of an attribute to not be displayed.

14. Apparatus comprising:

a processor;

a random access memory;

a mass storage device having a plurality of unprocessed log file messages stored therein;

a relational data base process performed by said processor to process said plurality of unprocessed log file messages into a set of relations stored in said random access memory; and display means for visually displaying non-textual geometric representations of said relations derived from said plurality of log file messages.

15. A method comprising the steps of:

originating a plurality of time-stamped messages, each message having a set of characteristics;

visually displaying a plurality of symbols, each symbol corresponding to a respective message of said plurality of messages, each symbol having an appearance that varies according to a characteristic of its respective message;

locating each symbol at a position that is determined by its respective time-stamp and a second characteristic of its respective message;

selecting one of said plurality of symbols; and displaying the message corresponding to said selected symbol.

16. Apparatus comprising:

means for originating a plurality of time-stamped messages, each message having a set of characteristics;

means for visually displaying a plurality of symbols, each symbol corresponding to a respective message of said plurality of messages;

each symbol having an appearance that varies according to a first characteristic of the set of characteristics of its respective message;

each symbol having a position that is determined by the time-stamp and a second characteristic of the set of characteristics of its respective message; and means for turning off the displaying of all symbols except those having a characteristic that they are from a selected module.

17. The apparatus according to claim 16, wherein said selected module is a processor module.

* * * * *